(12) United States Patent
Kaehler

(10) Patent No.: US 10,127,369 B2
(45) Date of Patent: *Nov. 13, 2018

(54) BLUE LIGHT ADJUSTMENT FOR BIOMETRIC SECURITY

(71) Applicant: Magic Leap, Inc., Plantation, FL (US)

(72) Inventor: Adrian Kaehler, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/449,780

(22) Filed: Mar. 3, 2017

(65) Prior Publication Data

US 2017/0255766 A1 Sep. 7, 2017

Related U.S. Application Data

(60) Provisional application No. 62/304,573, filed on Mar. 7, 2016, provisional application No. 62/304,556, filed on Mar. 7, 2016.

(51) Int. Cl.
*G06K 9/00* (2006.01)
*G06F 21/32* (2013.01)
*G06K 9/20* (2006.01)

(52) U.S. Cl.
CPC ........... *G06F 21/32* (2013.01); *G06K 9/0061* (2013.01); *G06K 9/00604* (2013.01); *G06K 9/00617* (2013.01); *G06K 9/2027* (2013.01); *G06K 9/2036* (2013.01); *G06K 9/00906* (2013.01)

(58) Field of Classification Search
CPC . G06T 2207/30041; G06T 2207/10152; G06F 21/32; G06F 3/013; G06K 9/00617; G06K 9/00885; G06K 9/0061; G06K 9/2027; G06K 9/00597; G06K 9/2036; G06K 9/00604; G06K 9/00906; G06K 9/00234; G06K 9/4652; G02B 27/0093;
(Continued)

(56) References Cited

U.S. PATENT DOCUMENTS 5,291,560 A 3/1994 Daugman
6,116,736 A 9/2000 Stark et al.
6,247,813 B1 6/2001 Kim et al.
(Continued)

FOREIGN PATENT DOCUMENTS

WO WO 2017/155826 9/2017

OTHER PUBLICATIONS

"Pupillary light reflex," Wikipedia, printed Oct. 12, 2015, in 6 pages. URL: https://en.wikipedia.org/wiki/Pupillary_light_reflex.
(Continued)

*Primary Examiner* — Carol Wang
(74) *Attorney, Agent, or Firm* — Knobbe, Martens, Olson & Bear, LLP

(57) ABSTRACT

Systems and methods for blue light adjustment with a wearable display system are provided. Embodiments of the systems and methods for blue light adjustment can include receiving an eye image of an eye exposed to an adjusted level of blue light; detecting a change in a pupillary response by comparison of the received eye image to a first image; determining that the pupillary response corresponds to a biometric characteristic of a human individual; and allowing access to a biometric application based on the pupillary response determination.

20 Claims, 11 Drawing Sheets

(58) Field of Classification Search
CPC .. G02B 27/017; G02B 27/026; A61B 3/0066; A61B 3/112; A61B 3/14; A61B 5/1171
See application file for complete search history.

(56) References Cited

U.S. PATENT DOCUMENTS

| | | | |
|---|---|---|---|
| 6,309,069 B1 | 10/2001 | Seal et al. | |
| 8,950,867 B2 | 2/2015 | Macnamara | |
| 9,215,293 B2 | 12/2015 | Miller | |
| 9,310,559 B2 | 4/2016 | Macnamara | |
| 9,348,143 B2 | 5/2016 | Gao et al. | |
| D758,367 S | 6/2016 | Natsume | |
| 9,417,452 B2 | 8/2016 | Schowengerdt et al. | |
| 2007/0110285 A1 | 5/2007 | Hanna et al. | |
| 2012/0127062 A1 | 5/2012 | Bar-Zeev et al. | |
| 2013/0082922 A1 | 4/2013 | Miller | |
| 2013/0125027 A1 | 5/2013 | Abovitz | |
| 2013/0169683 A1 | 7/2013 | Perez et al. | |
| 2014/0003762 A1 | 1/2014 | Macnamara | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0285436 A1 | 9/2014 | Wu | |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0245766 A1 | 9/2015 | Rennaker et al. | |
| 2015/0268415 A1 | 9/2015 | Schowengerdt et al. | |
| 2015/0302652 A1 | 10/2015 | Miller et al. | |
| 2015/0304535 A1 | 10/2015 | Smits et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2017/0048244 A1 | 2/2017 | Loughlin-McHugh et al. | |
| 2017/0091550 A1 | 3/2017 | Feng et al. | |
| 2017/0255814 A1 | 9/2017 | Kaehler | |

OTHER PUBLICATIONS

Daugman, J., "How Iris Recognition Works", IEEE Transactions on Circuits and Systems for Video Technology, vol. 14, No. 1, Jan. 2004, in 10 pages.

Eyal, N., "Your Fitness App Is Making You Fat," TechCrunch, posted Mar. 13, 2015, in 16 pages. URL: http://techcrunch.com/2015/03/13/your-fitness-app-is-making-you-fat/.

Pamplona et al., "Photorealistic Models for Pupil Light Reflex and Iridal Pattern Deformation," ACM Transactions on Graphics, vol. 28, No. 4, Aug. 2009, in 20 pages.

International Search Report and Written Opinion for PCT Application No. PCT/US2017/020767, dated May 23, 2017.

BLUE LIGHT ADJUSTMENT FOR BIOMETRIC SECURITY

CROSS-REFERENCE TO RELATED APPLICATIONS

This application claims the benefit of priority under 35 U.S.C. § 119(e) to U.S. Provisional Application No. 62/304,556, filed on Mar. 7, 2016, entitled "BLUE LIGHT ADJUSTMENT FOR BIOMETRIC IDENTIFICATION," and U.S. Provisional Application No. 62/304,573, filed on Mar. 7, 2016, entitled, "BLUE LIGHT ADJUSTMENT FOR BIOMETRIC SECURITY", each of which is hereby incorporated by reference herein in its entirety.

BACKGROUND

The present disclosure relates generally to systems and methods for processing eye imagery.

Description of the Related Art

The human iris can be used as a source of biometric information. Biometric information can provide authentication or identification of an individual. The process of extracting biometric information, broadly called a biometric template, typically has many challenges.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

In one aspect, a method for adjusting a level of blue light exposed to an eye is disclosed. The method is performed under control of a hardware computer processor. The method comprises receiving an initial eye image obtained by an image capture device, adjusting a level of blue light exposed to an eye associated with the initial eye image, receiving an adjustment eye image of the eye exposed to the adjusted level of blue light, detecting a change in a pupillary response of the adjustment eye image relative to the initial eye image, determining that the detected change in the pupillary response passes a biometric application threshold, and performing a biometric application. The method can be performed by a head mounted display system that includes a processor configured to adjust the level of blue light.

In another aspect, a method for identifying a human individual is described. The method is performed under control of a hardware computer processor. The method comprises adjusting a level of blue light, receiving an eye image of an eye exposed to the adjusted level of blue light, detecting a change in a pupillary response by comparison of the received eye image to a reference image, determining that the pupillary response corresponds to a biometric characteristic of a human individual, and allowing access to a biometric application based on the pupillary response determination. The method can be performed by a head mounted display system that includes a processor configured to identify a human individual.

Accordingly, systems and methods for blue light adjustment with a wearable display system are provided. Embodiments of the systems and methods for blue light adjustment can include receiving an initial eye image obtained by an image capture device; adjusting a level of blue light exposed to an eye associated with the initial eye image; receiving an adjustment eye image of the eye exposed to the adjusted level of blue light; detecting a change in a pupillary response of the adjustment eye image relative to the initial eye image; determining that the detected change in the pupillary response passes a biometric application threshold; and utilizing eye images or the detected change in the pupillary response for a biometric application.

Embodiments of the systems and methods for blue light adjustment can include receiving an eye image of an eye exposed to the adjusted level of blue light; detecting a change in a pupillary response by comparison of the received eye image to a reference image; determining that the pupillary response corresponds to a biometric characteristic of a human individual; and allowing access to a biometric application based on the pupillary response determination or performing a biometric security application based on the pupillary response determination.

Head-mounted, wearable augmented reality devices configured to perform embodiments of the disclosed blue light adjustment methods are provided.

Figure 1A:
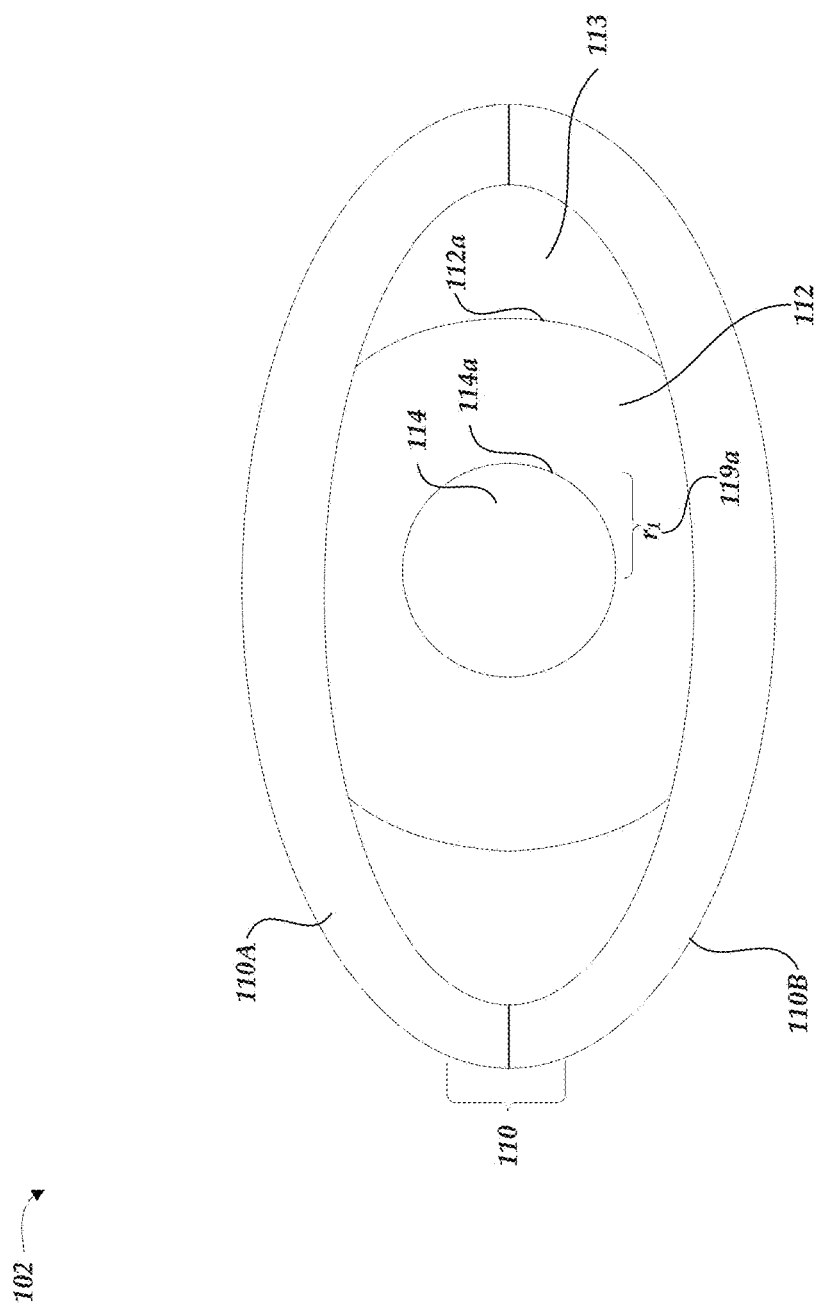
FIGS. 1A-1B schematically illustrate examples of an eye experiencing blue light adjustment.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Extracting biometric information from the eye generally includes a procedure for the segmentation of the iris within an eye image. Iris segmentation can involve operations including locating the iris boundaries, including finding the pupillary and limbic boundaries of the iris, localizing upper or lower eyelids if they occlude the iris, detecting and excluding occlusions of eyelashes, shadows, or reflections, and so forth. For example, the eye image can be included in an image of the face or may be an image of the periocular region. To perform iris segmentation, both the boundary of the pupil (the interior boundary of the iris) and the limbus (the exterior boundary of the iris) can be identified. In addition to this segmentation of the iris, the portion of the iris that is occluded by the eyelids (upper or lower) can be estimated. This estimation is performed because, during normal human activity, the entire iris of a person is rarely visible. In other words, the entire iris is not generally free from occlusions of the eyelids and eyelashes. Moreover, in dim or dark lighting environments, the pupil is dilated and the area of the iris is small. In such dim or dark lighting environments, it may be challenging to obtain quality images of the iris and to identify biometric features within the iris image.

The pupillary response of the human eye is particularly sensitive to changes in the level of blue light received by the eye. By increasing the level of blue light transmitted to the eye, the pupil will constrict. Iris images taken when the pupil is constricted are more likely to be of higher quality, because the iris area is larger and more biometric features of the iris will be apparent. For a given camera resolution, an iris image taken when the iris is expanded (e.g., due to increased levels of blue light) and the pupil is constricted will have higher resolution than an image taken when the iris is constricted (and the pupil expanded), because the expanded iris presents a greater area of the iris to the camera. More iris features can be obtained from such an image and better quality iris codes can be generated from such images.

Further, the pupil of a living human eye has distinctive biometric responses to changes in light levels, particularly levels of blue light. For example, the times needed for the pupil to dilate (in response to a decrease in light levels) or constrict (in response to an increase in light levels) are not only measurable but can be specific to each particular individual. By measuring the time-varying pupillary response caused by changing light levels (particularly blue light), the systems described in more detail below can not only identify a particular individual but also determine that the eye images are from a living individual (the pupil size will change in a specific fashion) rather than from a still image or 3D model of the individual's eye (in which the pupil size is fixed). Accordingly, embodiments of these systems can provide increased security, because they reduce the likelihood that an unauthorized person can attempt to fool (or "spoof") the system into permitting access by presenting still images or 3D models of the authorized user's iris. An individual may experience pupillary a response that is different when he or she is under the influence of alcohol or medications. Embodiments of these systems may be used to determine that the individual's pupillary response is different (e.g., from the individual's pupillary response in a non-alcoholic or non-medicated state) or from a normal pupillary response that is typical for a relevant class of individuals (e.g., gender identity, age, sex, ethnicity, familial response, health, physical abilities, etc.) and can thereby assist identifying individuals who are under the influence of alcohol or medication.

Example of an Eye Experiencing Blue Light Adjustment

Figure 1B:
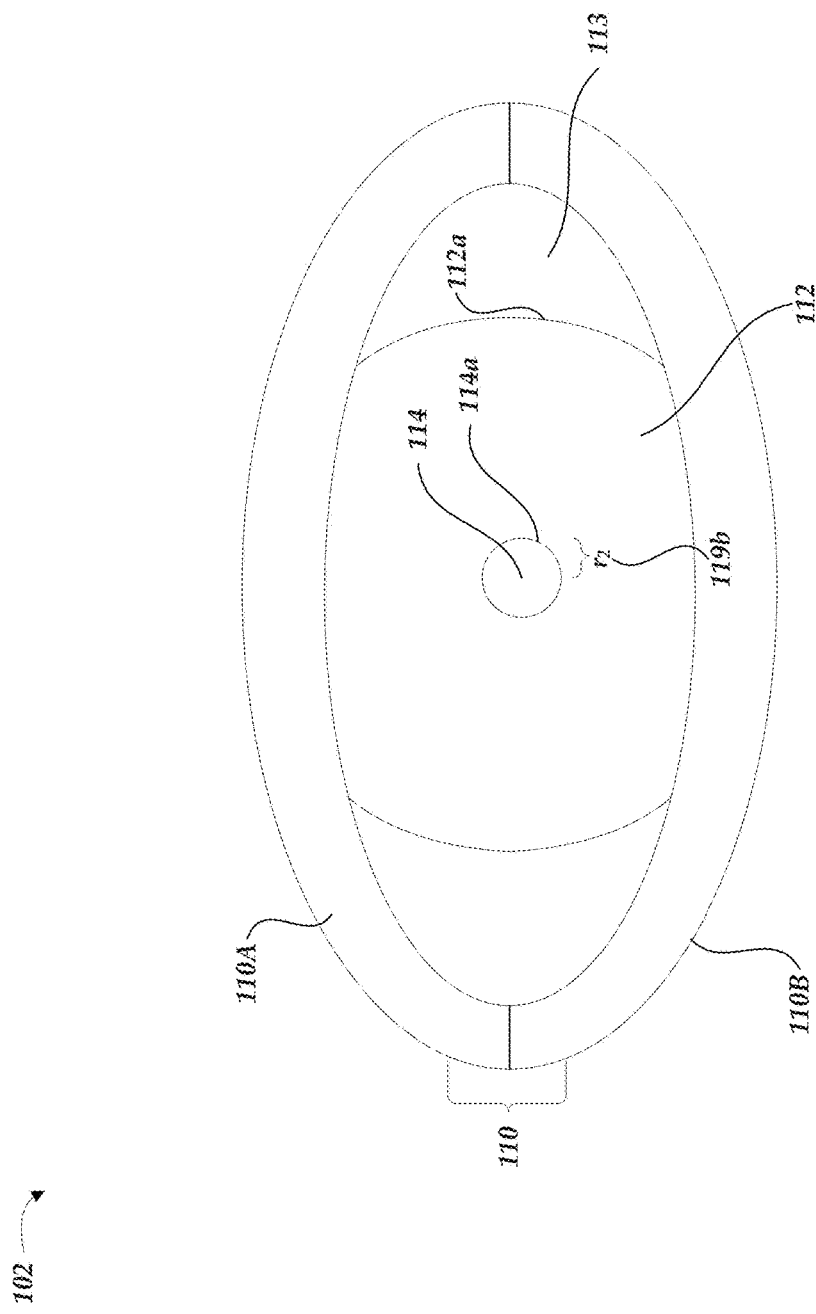

FIGS. 1A-1B schematically illustrate an example of an eye experiencing blue light adjustment, possibly due to pupillary light reflex (PLR) or photopupillary reflex. FIG. 1A illustrates an image of an eye 102 with the eyelids 110, the iris 112, and the pupil 114. In FIG. 1A, the pupil 114 has a radius $r_1$ 119a. The pupillary boundary 114a is between the pupil 114 and the iris 112, and the limbic boundary 112a is between the iris 112 and the sclera 113 (the "white" of the eye). The eyelids 110 include an upper eyelid 110a and a lower eyelid 110b. When a human eye is exposed to light or darkness, the pupil exhibits a physiological response—the pupillary response. The pupillary response includes both constriction and dilation responses. For example, exposure to light may cause a pupillary constriction response (e.g., reducing the size of the pupil). This may be referred to as miosis. In contrast, a dark environment may cause the pupillary dilation response (e.g., enlarging the size of the pupil). This may be referred to as mydriasis. A change in size can refer to a change in the diameter, radius, circumference, and/or area of the element of the eye 102 experiencing that change (e.g., increasing size or decreasing size of the pupil or the iris).

The term pupillary response may refer to measurement from an eye image of a feature of the eye (e.g., a pupil or iris size) or a change the eye feature calculated between two or more images (e.g., a change in pupil or iris size). When referring to light, the term "level" may refer to an absolute intensity of a certain range of wavelengths or a relative intensity (e.g., proportion of intensity, ratio of intensity) of a range of wavelengths compared to a different range of wavelengths. The term "level" may also refer to the direction the light is directed and/or into which waveguide the light is directed. For example, light may be referred to as being at a higher level when it is directed into a more sensitive area of an eye or when a greater proportion of a color (e.g., range of wavelengths) is directed into a waveguide tuned to that color. A certain level of a color (e.g., blue) of light may be increased by tuning the wavelength or wavelengths of the light to more fully or directly fall in a given range of wavelengths. For example, blue light may refer to wavelengths between 400 nm and 525 nm. However, a level of blue light may be said to increase by changing a wavelength from 450 nm to 470 nm since 470 nm is said to be more "deeply" or more "centrally" in the blue color range. A level of blue may be said to increase by changing the amount of blue light relative to the amount of light in other visible wavelength bands (e.g., green light from 525 nm to 600 nm and red light from 600 nm to 750 nm). One range of wavelengths may be different from another range of wavelengths even if the ranges partially overlap.

The human eye includes intrinsically-photosensitive retinal ganglion cells (ipRGCs or pRGCs) that contribute to the pupillary response. For example, such cells, responding to light absorbed by the pigment melonopsin, are primarily sensitive to light in a bandwidth range between about 445 nm and 525 nm. Such a bandwidth range includes violet light colors and blue light colors. The ipRGCs may have peak receptivity at around 488 nm, in the middle of the blue light color band. Any light in the sensitivity range for the ipRGCs may be referred to as blue light.

When a human eye is exposed to light, and particularly to an increased level of blue light, the pupil 114 may decrease in size. For example, FIG. 1B shows a decreased radius $r_2$ 119b relative to the radius $r_1$ 119a in FIG. 1A. Accordingly, FIG. 1B schematically illustrates an example of an eye experiencing blue light adjustment. The increased level of blue light in FIG. 1B relative to the light exposed to the eye 102 in FIG. 1A constricts the size of the pupil 114. In turn, the size and area of the iris 112 increases in FIG. 1B relative to its size in FIG. 1A. Thus, this increased level of blue light exposure may enhance the resolution of an iris in eye image (because a greater iris area is presented to an eye-imaging camera), allowing enhanced iris code generation given that more iris features can be identified in the larger iris. Systems and methods are described herein to adjust the level of blue light to enhance iris code generation, to identify individuals, to identify biometric responses of individuals, or to reduce or prevent spoofing of the system. For example, from the Munsell color system perspective, colors are represented by three spectral attributes: chroma, lightness (or value), and hue. Continuing in this example with FIGS. 1A-1B, the eye 102 is exposed to light in FIG. 1A; and, in FIG. 1B, an increased blue light means increased chroma (or saturation) values corresponding to increased "blueness."

Increasing the level of blue light exposed to the eye 102 can be accomplished in a variety of ways. For example, a display may increase the level of blue light relative to the level of blue light at an earlier time (e.g., flash blue light for a certain time period). Some or all of the light source may output primarily blue light for a short period of time, e.g., by increasing the number of pixels or the amount of display area that is outputting blue light. The light source may output blue light by actuating or increasing the intensity of blue pixels. Or as another example, the light source may increase the perceived output of blue light by de-actuating or decreasing the intensity from red and green pixels. Other variations or controls can also be implemented to increase the level of blue light from a light source. A displayed pixel can be shifted to an increased level of blue light relative to levels of non-blue light. As yet another example, a blue graphic may be displayed on the image being shown to the user to increase the amount of blue light. For example, a blue butterfly (or any other suitable graphic) may be superimposed on the image so that the user's eyes perceive more blue light than they would from the image without the blue graphic. Such a blue butterfly may appear at start-up times for a wearable display system. For example, it may be advantageous to have a scene (e.g., with a blue butterfly) displayed by the wearable display system with increasing blue light during start-up of a wearable display system for user identification. As described herein (e.g., with respect to the "Example of Individual Identification with a Pupillary Response" below), the pupillary response to blue light (e.g., a scene with a blue butterfly and/or an increasingly blue sky) can be utilized in a biometric identification system. The level of blue light (e.g., brightness or area of the blue graphic) may change with time so that a time-varying pupillary response is induced in the viewer of the display system.

Pixels in a display may be represented by subpixels displaying red (R), green (G), blue (B) colors. Accordingly, a displayed pixel represented by a blue value, a red value, and a green value can be shifted to a changed (increased or decreased) amount of blue values by, e.g., changing the intensity of the B subpixels. Devices coupled to the wearable display system (e.g., image injection devices 200, 202, 204, 206, 208 described with reference to FIG. 4) may also change levels of blue light, for example, by changing the blue color projected by the device. In some embodiments, the wearable display system may include a separate light source that can project primarily blue toward one or both of the wearer's eyes.

An eyepiece can be included in the head mounted display system. It can be configured to transmit light from one or more light sources to the user as an image. In some embodiments, the eyepiece is optically transmissive and is configured to transmit light from a user's environment to the user. The eyepiece may include one or more light sources that are configured to display light through the eyepiece.

The level of blue light can be increased or decreased in a time-varying fashion to elicit a corresponding pupillary response from the individual. The individual's pupillary response to the time-varying light levels can be used for the biometric applications described herein.

An image of the iris can be taken and regularized. In some embodiments, when the iris image has been regularized, the image data can be used to decompose the iris into individual cells. For example, a Gabor (or similar) filter convolution method may be used to calculate a dominant orientation for each cell. Once an orientation is computed, it may be binned. In some embodiments, four bins are used, from which a two bit signature for each cell can be assigned. This two-bit signature may be referred to as the bin ID.

In some implementations, bin IDs for 1000 cells (or more) can be computed from between 25,000 and 60,000 pixels. In some embodiments, fewer than 25,000 pixels are used to compute the bin IDs for the cells.

The amount of information which is spread across the regularized image may depend on the dilation state of the pupil. In some embodiments, the regularized image is a rectangular image with pixels mapped from the iris such that their angular location in the original iris is mapped to the long axis of the rectangle (e.g., the "horizontal" or "x" axis), while the radial distance from the pupil out toward the limbus boundary is mapped to short axis (e.g., the "vertical" or "y" axis). When the pupil is strongly dilated, the number of pixels available in the input image to map onto the regularized image may be much less than when the pupil is constricted. The distortion of the iris may not be linear.

Example Wearable Display System Using Blue Light Adjustment

In some embodiments, display systems can be wearable, which may advantageously provide a more immersive virtual reality (VR) or augmented reality (AR) experience, wherein digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 2:
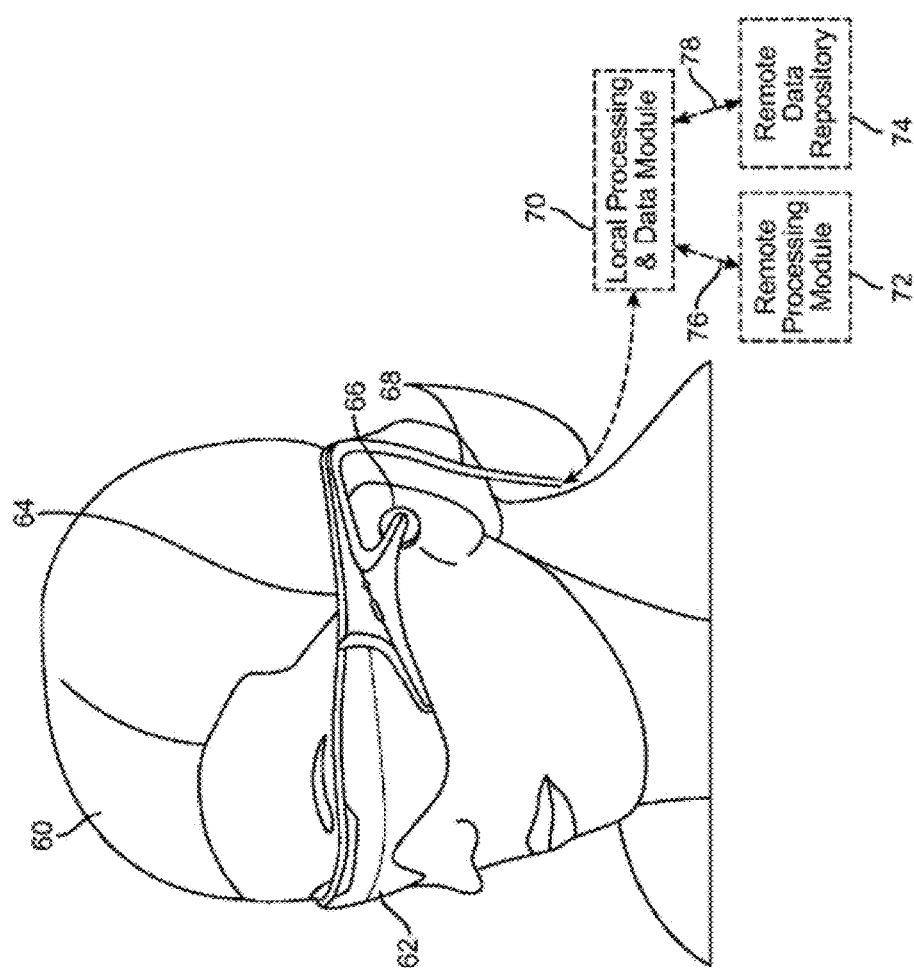
FIG. 2 schematically illustrates an example of a wearable display system.

FIG. 2 illustrates an example of a wearable display system 100 that can be used to present a VR or an AR experience to the wearer. VR and AR systems that provide multiple depth plane virtual or augmented reality experiences may also be termed mixed reality (MR) systems or experiences. The wearable display system 100 may be programmed to perform blue light adjustment to provide any of the applications or embodiments described herein. The display system 100 includes a display 62, and various mechanical and electronic modules and systems to support the functioning of that display 62. The display 62 may be coupled to a frame 64, which is wearable by a display system wearer or viewer 60 and which is configured to position the display 62 in front of the eyes of the wearer 60. The display 62 may be a light field display. In some embodiments, a speaker 66 is coupled to the frame 64 and positioned adjacent the ear canal of the user (in some embodiments, another speaker, not shown, is positioned adjacent the other ear canal of the user to provide for stereo/shapeable sound control). The display system 100 can include an outward-facing imaging system which observes the world in the environment around the wearer (see, e.g., the imaging system 502 shown in FIG. 4). The outward-facing imaging system 502 can include cameras equipped with light sensors that can detect blue light. The display system 100 can also include an inward-facing imaging system which can track the eye movements of the wearer (see, e.g., the imaging system 500 shown in FIG. 4). The inward-facing imaging system may track either one eye's movements or both eyes' movements. The display 62 is operatively coupled 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). The local data processing module 70 can comprise one or more hardware processors (e.g., programmable electronic devices, microprocessers, microcontrollers, etc.).

The frame 64 can have one or more cameras attached or mounted to the frame 64 to obtain images of the wearer's eye(s). In one embodiment, the camera(s) may be mounted to the frame 64 in front of a wearer's eye so that the eye can be imaged directly. In other embodiments, the camera can be mounted along a stem of the frame 62 (e.g., near the wearer's ear). In such an embodiment, the display 62 may be coated with a material that reflects light from the wearer's eye back toward the camera. The light may be infrared light, since iris features are prominent in infrared images.

In the context of a wearable head mounted display (HMD) such as wearable display system 100, cameras may be closer to the user's eyes than a camera coupled to a user's monitor. For example, cameras may be mounted on the wearable HMD, which itself is worn on a user's head. The proximity of the eyes to such a camera can result in higher resolution eye image. Accordingly, it is possible for computer vision techniques to extract visual features from the user's eyes, particularly at the iris (e.g., an iris feature) or in the sclera surrounding the iris (e.g., a scleral feature). For example, when viewed by a camera near the eye, the iris of an eye will show detailed structures. Such iris features are particularly pronounced when observed under infrared illumination and can be used for biometric identification. These iris features are unique from user to user and, in the manner of a fingerprint, can be used to identify the user uniquely. Eye features can include blood vessels in the sclera of the eye (outside the iris), which may also appear particularly pronounced when viewed under red or infrared light. Such distinctive iris features, viewed at a higher resolution, may lead to more unique or accurate iris codes generated for various eye pose image. For example, with the techniques disclosed herein, blue light adjustment can be used to substantially enhance the resolution of eye image for iris code generation.

The local processing and data module 70 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 64 or otherwise attached to the wearer 60), such as image capture devices (such as cameras), microphones, inertial measurement units, accelerometers, compasses, GPS units, radio devices, and/or gyros; and/or (b) acquired and/or processed using remote processing module 72 and/or remote data repository 74, possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. The image capture device(s) can be used to capture the eye images used in the blue light adjustment procedures.

In some embodiments, the remote processing module 72 may comprise one or more hardware processors (e.g., servers) configured to analyze and process data and/or image information such as video information captured by an image capture device. The video data may be stored locally in the local processing and data module 70 and/or in the remote data repository 74. As used herein, video is used in its ordinary sense and includes, but is not limited to, a recording of a sequence of visual images. Each image in a video is sometimes referred to as an image frame or simply a frame. A video can include a plurality of sequential frames, either with or without an audio channel. A video can include a plurality of frames, which are ordered in time. Accordingly, an image in a video can be referred to as an eye image frame or eye image.

In some embodiments, the remote data repository 74 may comprise a digital data storage facility, which may be available through the internet or other networking configuration in a "cloud" resource configuration. In some embodiments, all data is stored and all computations are performed in the local processing and data module 70, allowing fully autonomous use from a remote module.

In some implementations, the local processing and data module 70 and/or the remote processing module 72 are programmed to perform embodiments of obtaining eye images or processing eye images as described herein. For example, the local processing and data module 70 and/or the remote processing module 72 can be programmed to perform embodiments of the routine 800, 900, or 1000 described with reference to FIGS. 8, 9, and 10 respectively. The local processing and data module 70 and/or the remote processing module 72 can be programmed to use the blue light adjustment techniques disclosed herein in biometric extraction, for example to identify or authenticate the identity of the wearer 60, or in estimating pose, for example to determine a direction toward which each eye is looking. The image capture device can capture video for a particular application (e.g., video of the wearer's eye for an eye-tracking application). The video can be analyzed using various eye image processing techniques by one or both of the processing modules 70, 72. With this analysis, processing modules 70, 72 may perform blue light adjustments. As an example, the local processing and data module 70 and/or the remote processing module 72 can be programmed to receive an initial eye image from cameras attached to the frame 64 (e.g., the routine 900 or 950). In addition, the local processing and data module 70 and/or the remote processing module 72 can be programmed, for example, to determine whether a detected change passes a biometric application threshold (e.g., the routine 800) or, as another example, to determine whether the pupillary response (e.g., a particular state of the pupillary response) identifies a characteristic of an individual (e.g., the routine 900) based on the level of blue light adjusted in connection with the wearable display system 100. In some cases, off-loading at least some of the techniques described herein to a remote processing module (e.g., in the "cloud") may improve efficiency or speed of the computations, for example, the blue light pupillary response routine (e.g., routine 800) may be off loaded to a remote processing module. Or as another example, some portions of the techniques can be off-loaded to a remote processing module, such as the blue light identification routine (e.g., routine 900).

The results of the video analysis (e.g., an estimated eye pose) can be used by one or both of the processing modules 70, 72 for additional operations or processing. For example, in various applications, biometric identification, eye-tracking, recognition, or classification of objects, poses, etc. may be used by the wearable display system 100. For example, video of the wearer's eye(s) can be used for obtaining eye images, which, in turn, can be used by the processing modules 70, 72 to determine an iris code of an eye of the wearer 60 through the display 62. The processing modules 70, 72 of the wearable display system 100 can be programmed with one or more embodiments of blue light adjustment to perform any of the video or image processing applications described herein.

The human visual system is complicated and providing a realistic perception of depth is challenging. Without being limited by theory, it is believed that viewers of an object may perceive the object as being three-dimensional due to a combination of vergence and accommodation. Vergence movements (e.g., rotational movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
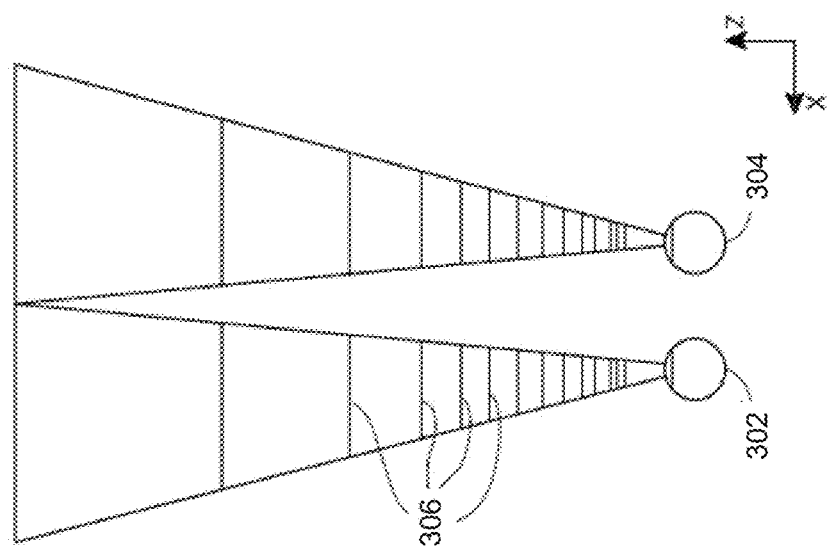
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
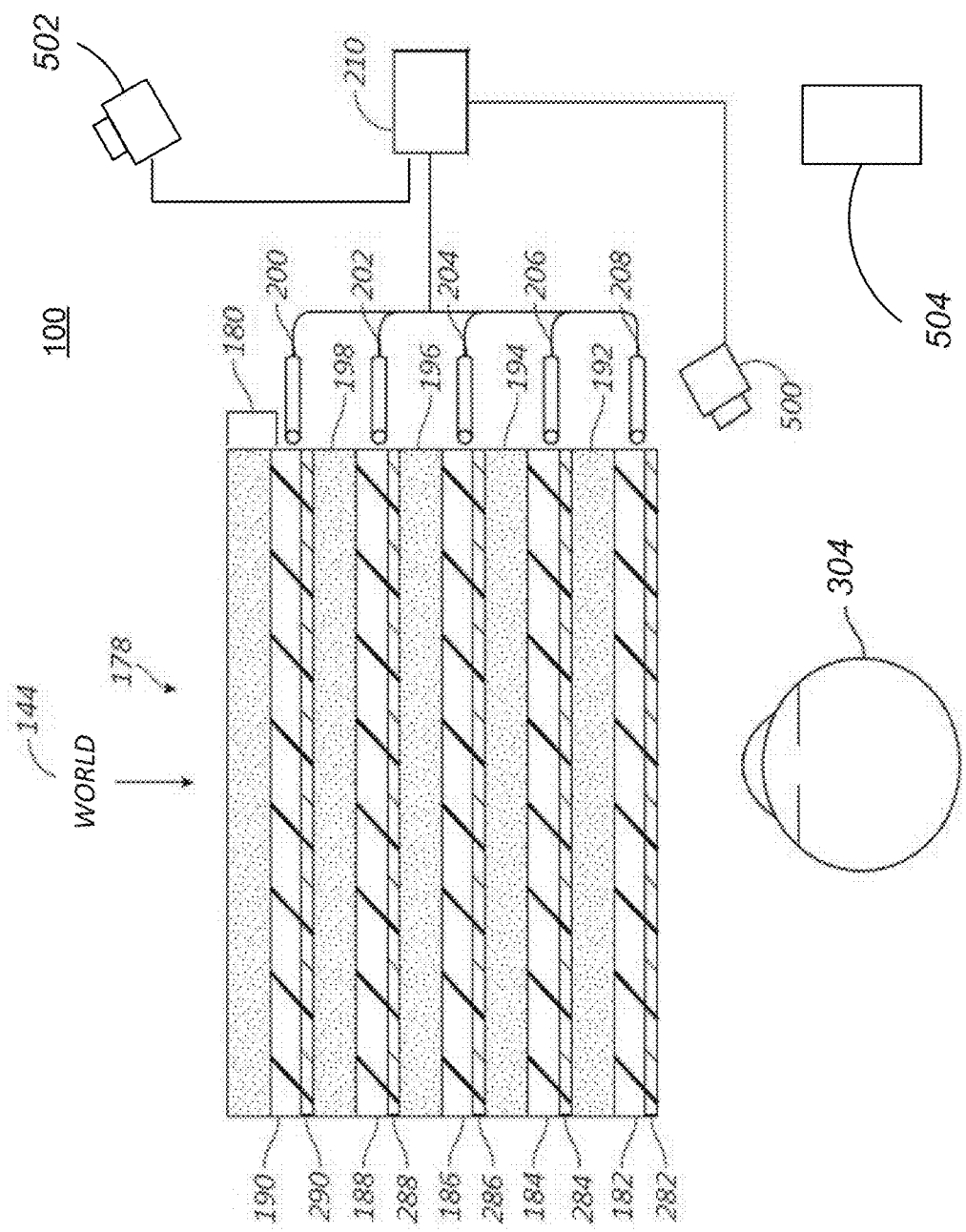
FIG. 4 schematically illustrates an example of a waveguide stack for outputting image information to a user.

FIG. 4 illustrates an example of a waveguide stack for outputting image information to a user. A display system 100 includes a stack of waveguides, or stacked waveguide assembly 178 that may be utilized to provide three-dimensional perception to the eye/brain using a plurality of waveguides 182, 184, 186, 188, 190. In some embodiments, the display system 100 may correspond to system 100 of FIG. 2, with FIG. 4 schematically showing some parts of that system 100 in greater detail. For example, in some embodiments, the waveguide assembly 178 may be integrated into the display 62 of FIG. 2.

With continued reference to FIG. 4, the waveguide assembly 178 may also include a plurality of features 198, 196, 194, 192 between the waveguides. In some embodiments, the features 198, 196, 194, 192 may be lenses. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may be utilized to inject image information into the waveguides 182, 184, 186, 188, 190, each of which may be configured to distribute incoming light across each respective waveguide, for output toward the eye 304. Light exits an output surface of the image injection devices 200, 202, 204, 206, 208 and is injected into a corresponding input edge of the waveguides 182, 184, 186, 188, 190. In some embodiments, a single beam of light (e.g., a collimated beam) may be injected into each waveguide to output an entire field of cloned collimated beams that are directed toward the eye 304 at particular angles (and amounts of divergence) corresponding to the depth plane associated with a particular waveguide.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208. Image injection devices 200, 202, 204, 206, 208 may be configured to produce increased levels of blue light to the waveguides 182, 184, 186, 188, 190, respectively, corresponding to adjustments of blue light, as described in the systems and methods herein. In one embodiment, image injection devices 200, 202, 204, 206, 208 are configured to produce light at wavelengths corresponding to the color blue for short periods of time (e.g., from about 10 ms to about 1000 ms). In some embodiments, one or more short flashes of blue light may be displayed. The one or more short flashes may each last less than about 1000 ms. In some embodiments, the one or more flashes each last between about 50 ms and 800 ms. The light may be "pulsed" at regular (or irregular) intervals. Each pulse may last between about 10 ms and 500 ms. The time between each pulse may be similarly short (e.g., between 10 ms and 500 ms, between 50 ms and 800 ms). The total length of time the pulsing lasts may be less than 100 ms, less than 500 ms, and/or less than 2000 ms.

A controller 210 controls the operation of the stacked waveguide assembly 178 and the image injection devices 200, 202, 204, 206, 208. In some embodiments, the controller 210 includes programming (e.g., instructions in a non-transitory computer-readable medium) that regulates the timing and provision of image information to the waveguides 182, 184, 186, 188, 190. For example, with respect to the blue light adjustment techniques described herein, the controller 210 may regulate the timing and provision of blue light provided to the waveguides 182, 184, 186, 188, 190 by image injection devices 200, 202, 204, 206, 208. In some embodiments, the controller may be a single integral device, or a distributed system connected by wired or wireless communication channels. The controller 210 may be part of the processing modules 71 or 72 (illustrated in FIG. 2) in some embodiments.

The waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include light extracting optical elements 282, 284, 286, 288, 290 that are configured to extract light out of a waveguide by redirecting the light, propagating within each respective waveguide, out of the waveguide to output image information to the eye 304. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (82, 284, 286, 288, 290 may, for example, be reflective and/or diffractive optical features. While illustrated disposed at the bottom major surfaces of the waveguides 182, 184, 186, 188, 190 for ease of description and drawing clarity, in some embodiments, the light extracting optical elements 282, 284, 286, 288, 290 may be disposed at the top and/or bottom major surfaces, and/or may be disposed directly in the volume of the waveguides 182, 184, 186, 188, 190. In some embodiments, the light extracting optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the light extracting optical elements 282, 284, 286, 288, 290 may be formed on a surface and/or in the interior of that piece of material.

With continued reference to FIG. 4, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 304. The collimated light may be representative of the optical infinity focal plane. The next waveguide up 184 may be configured to send out collimated light which passes through the first lens 192 (e.g., a negative lens) before it can reach the eye 304. First lens 192 may be configured to create a slight convex wavefront curvature so that the eye/brain interprets light coming from that next waveguide up 184 as coming from a first focal plane closer inward toward the eye 304 from optical infinity. Similarly, the third up waveguide 186 passes its output light through both the first lens 192 and second lens 194 before reaching the eye 304. The combined optical power of the first and second lenses 192 and 194 may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers (e.g., waveguides 188, 190) and lenses (e.g., lenses 196, 198) are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

The display system 100 can include an outward-facing imaging system 502 (e.g., a digital camera) that images a portion of the world 144. This portion of the world 144 may be referred to as the field of view (FOV) and the imaging system 502 is sometimes referred to as an FOV camera. The entire region available for viewing or imaging by a viewer may be referred to as the field of regard (FOR). In some HMD implementations, the FOR may include substantially all of the solid angle around a wearer of the HMD, because the wearer can move their head and eyes to look at objects surrounding the wearer (in front, in back, above, below, or on the sides of the wearer). Images obtained from the outward-facing imaging system 502 can be used to track gestures made by the wearer (e.g., hand or finger gestures), detect objects in the world 144 in front of the wearer, and so forth.

The display system 100 can include a user input device 504 by which the user can input commands to the controller 210 to interact with the system 100. For example, the user input device 504 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the system 100 (e.g., to provide user input to a user interface provided by the system 100). The user input device 504 may be held by the user's hand during use of the system 100. The user input device 504 can be in wired or wireless communication with the display system 100.

With continued reference to FIG. 4, the light extracting optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety. In some embodiments, the features 198, 196, 194, 192 may not be lenses. Rather, they may simply be spacers (e.g., cladding layers and/or structures for forming air gaps).

In some embodiments, the light extracting optical elements 282, 284, 286, 288, 290 are diffractive features that form a diffraction pattern, or "diffractive optical element" (also referred to herein as a "DOE"). Preferably, the DOE's have a relatively low diffraction efficiency so that only a portion of the light of the beam is deflected away toward the eye 304 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. In some embodiments, an imaging system 500 (e.g., a digital camera) may be used to capture images of the eye 304 to determine the size and/or orientation of the pupil of the eye 304. The imaging system 500 can be used to obtain images for use in determining the direction the wearer 60 is looking (e.g., eye pose). In some embodiments, the imaging system 500 may be attached to the frame 64 (as illustrated in FIG. 2) and may be in electrical communication with the processing modules 71 and/or 72, which may process image information from the camera 50) to determine, e.g., the pupil diameters and/or orientations of the eyes or eye pose of the user 60. In some embodiments, one imaging system 500 may be utilized for each eye, to separately determine the pupil size and/or orientation of each eye, thereby allowing the presentation of image information to each eye to be dynamically tailored to that eye. In some other embodiments, the pupil diameter and/or orientation of only a single eye 304 (e.g., using only a single imaging system 500 per pair of eyes) is determined and assumed to be similar for both eyes of the viewer 60.

For example, depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 210 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

Figure 5:
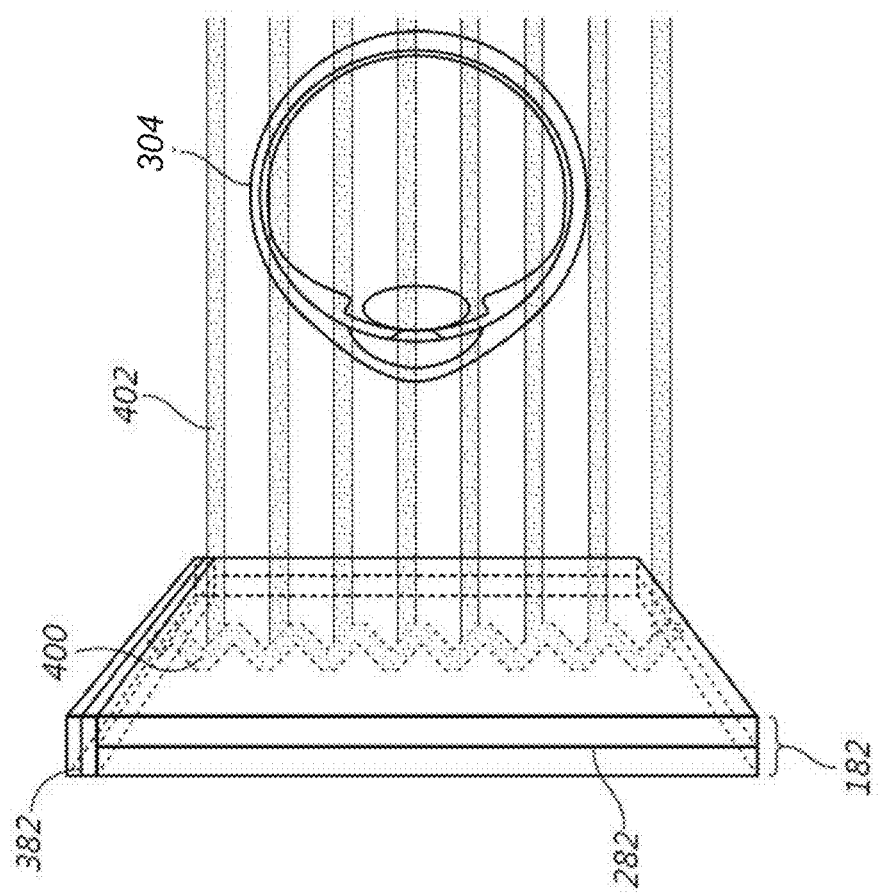
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 178 may function similarly, where the waveguide assembly 178 includes multiple waveguides. Light 400 is injected into the waveguide 182 at the input edge 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but they may also be redirected to propagate to the eye 304 at an angle (e.g., forming divergent exit beams), depending on the depth plane associated with the waveguide 182. It will be appreciated that substantially parallel exit beams may be indicative of a waveguide with light extracting optical elements that outcouple light to form images that appear to be set on a depth plane at a large distance (e.g., optical infinity) from the eye 304. Other waveguides or other sets of light extracting optical elements may output an exit beam pattern that is more divergent, which would require the eye 304 to accommodate to a closer distance to bring it into focus on the retina and would be interpreted by the brain as light from a distance closer to the eye 304 than optical infinity.

Figure 6:
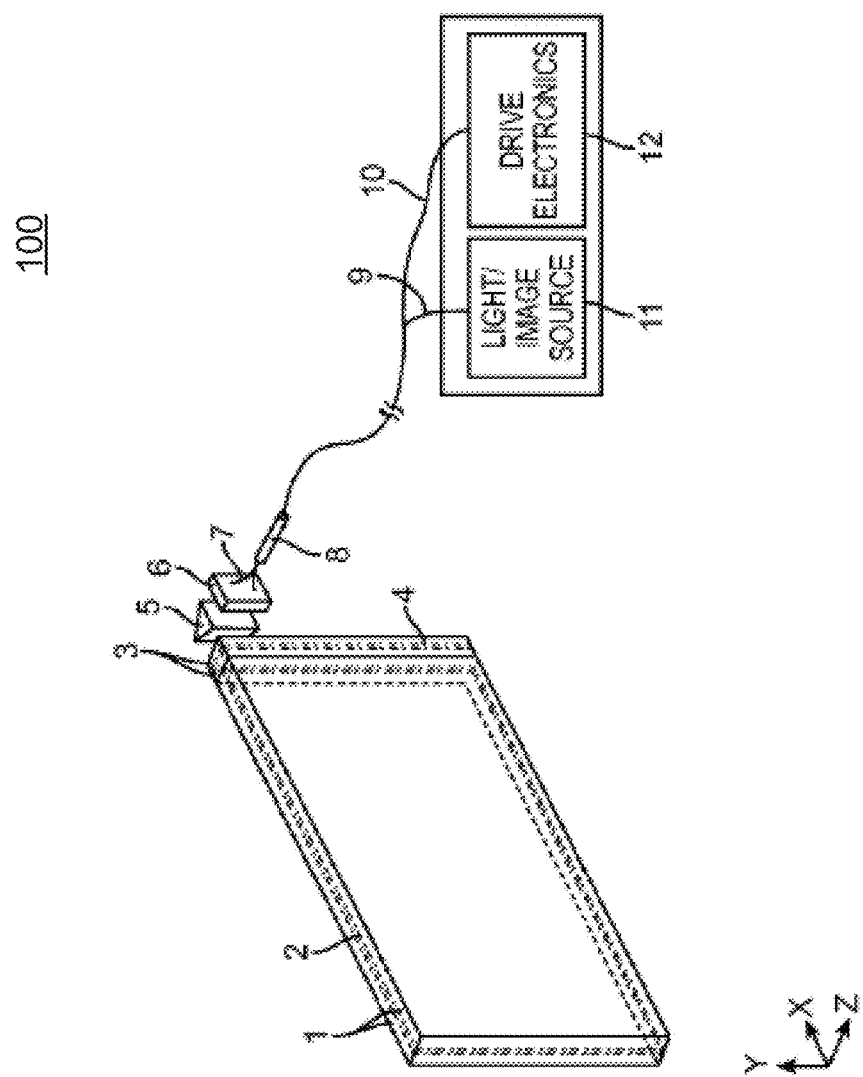
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 shows another example of the optical display system 100 including a waveguide apparatus, an optical coupler subsystem to optically couple light to or from the waveguide apparatus, and a control subsystem. The optical system 100 can be used to generate a multi-focal volumetric, image, or light field. The optical system can include one or more primary planar waveguides 1 (only one is shown in FIG. 6) and one or more DOEs 2 associated with each of at least some of the primary waveguides 10. The planar waveguides 1 can be similar to the waveguides 182, 184, 186, 188, 190 discussed with reference to FIG. 4. The optical system may employ a distribution waveguide apparatus, to relay light along a first axis (vertical or Y-axis in view of FIG. 6), and expand the light's effective exit pupil along the first axis (e.g., Y-axis). The distribution waveguide apparatus, may, for example include a distribution planar waveguide 3 and at least one DOE 4 (illustrated by double dash-dot line) associated with the distribution planar waveguide 3. The distribution planar waveguide 3 may be similar or identical in at least some respects to the primary planar waveguide 1, having a different orientation therefrom. Likewise, the at least one DOE 4 may be similar or identical in at least some respects to the DOE 2. For example, the distribution planar waveguide 3 and/or DOE 4 may be comprised of the same materials as the primary planar waveguide 1 and/or DOE 2, respectively. The optical system shown in FIG. 6 can be integrated into the wearable display system 100 shown in FIG. 2.

The relayed and exit-pupil expanded light is optically coupled from the distribution waveguide apparatus into the one or more primary planar waveguides 10. The primary planar waveguide 1 relays light along a second axis, preferably orthogonal to first axis, (e.g., horizontal or X-axis in view of FIG. 6). Notably, the second axis can be a non-orthogonal axis to the first axis. The primary planar waveguide 10 expands the light's effective exit pupil along that second axis (e.g., X-axis). For example, the distribution planar waveguide 3 can relay and expand light along the vertical or Y-axis, and pass that light to the primary planar waveguide 1 which relays and expands light along the horizontal or X-axis.

The optical system may include one or more sources of colored light (e.g., red, green, and blue laser light) 110 which may be optically coupled into a proximal end of a single mode optical fiber 9. A distal end of the optical fiber 9 may be threaded or received through a hollow tube 8 of piezoelectric material. The distal end protrudes from the tube 8 as fixed-free flexible cantilever 7. The piezoelectric tube 8 can be associated with four quadrant electrodes (not illustrated). The electrodes may, for example, be plated on the outside, outer surface or outer periphery or diameter of the tube 8. A core electrode (not illustrated) is also located in a core, center, inner periphery or inner diameter of the tube 8.

Drive electronics 12, for example electrically coupled via wires 10, drive opposing pairs of electrodes to bend the piezoelectric tube 8 in two axes independently. The protruding distal tip of the optical fiber 7 has mechanical modes of resonance. The frequencies of resonance can depend upon a diameter, length, and material properties of the optical fiber 7. By vibrating the piezoelectric tube 8 near a first mode of mechanical resonance of the fiber cantilever 7, the fiber cantilever 7 is caused to vibrate, and can sweep through large deflections.

By stimulating resonant vibration in two axes, the tip of the fiber cantilever 7 is scanned biaxially in an area filling two dimensional (2-D) scan. By modulating an intensity of light source(s) 11 in synchrony with the scan of the fiber cantilever 7, light emerging from the fiber cantilever 7 forms an image. Descriptions of such a set up are provided in U.S. Patent Publication No. 2014/0003762, which is incorporated by reference herein in its entirety.

A component of an optical coupler subsystem collimates the light emerging from the scanning fiber cantilever 7. The collimated light is reflected by mirrored surface 5 into the narrow distribution planar waveguide 3 which contains the at least one diffractive optical element (DOE) 4. The collimated light propagates vertically (relative to the view of FIG. 6) along the distribution planar waveguide 3 by total internal reflection, and in doing so repeatedly intersects with the DOE 4. The DOE 4 preferably has a low diffraction efficiency. This causes a fraction (e.g., 10%) of the light to be diffracted toward an edge of the larger primary planar waveguide 1 at each point of intersection with the DOE 4, and a fraction of the light to continue on its original trajectory down the length of the distribution planar waveguide 3 via TIR.

At each point of intersection with the DOE 4, additional light is diffracted toward the entrance of the primary waveguide 1. By dividing the incoming light into multiple outcoupled sets, the exit pupil of the light is expanded vertically by the DOE 4 in the distribution planar waveguide 3. This vertically expanded light coupled out of distribution planar waveguide 3 enters the edge of the primary planar waveguide 1.

Light entering primary waveguide 1 propagates horizontally (relative to the view of FIG. 6) along the primary waveguide 1 via TIR. As the light intersects with DOE 2 at multiple points as it propagates horizontally along at least a portion of the length of the primary waveguide 10 via TIR. The DOE 2 may advantageously be designed or configured to have a phase profile that is a summation of a linear diffraction pattern and a radially symmetric diffractive pattern, to produce both deflection and focusing of the light. The DOE 2 may advantageously have a low diffraction efficiency (e.g., 10%), so that only a portion of the light of the beam is deflected toward the eye of the view with each intersection of the DOE 2 while the rest of the light continues to propagate through the waveguide 1 via TIR.

At each point of intersection between the propagating light and the DOE 2, a fraction of the light is diffracted toward the adjacent face of the primary waveguide 1 allowing the light to escape the TIR, and emerge from the face of the primary waveguide 1. In some embodiments, the radially symmetric diffraction pattern of the DOE 2 additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 1 by a multiplicity of DOEs 2 at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Example of Pupillary Response to Blue Light Adjustment

Figure 7:
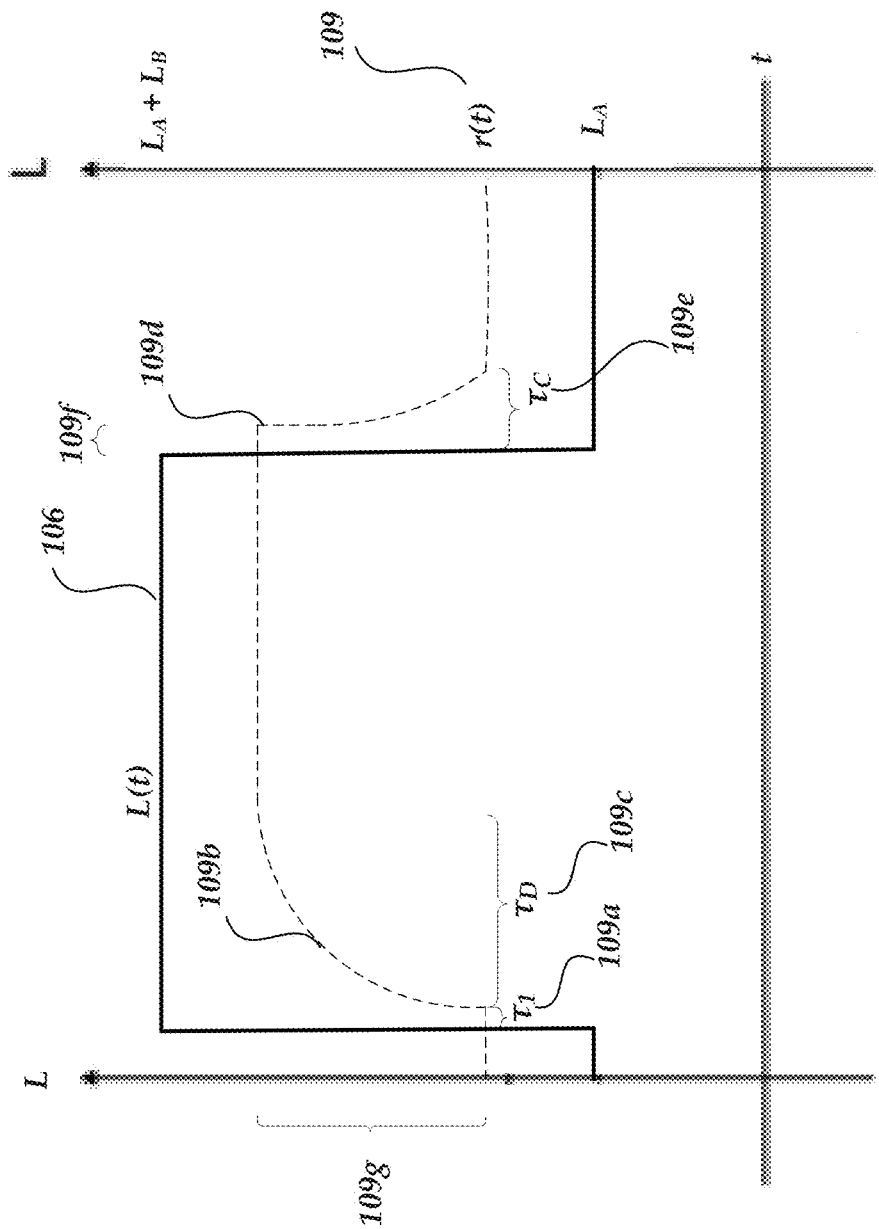
FIG. 7 schematically illustrates an example pupillary response to light adjustment.

FIG. 7 schematically illustrates an example pupillary response to light adjustment. In addition to the construction and dilation of the pupil as described above with respect to the example of an eye experiencing blue light adjustment, other physiological characteristics of the eye may be affected by the exposure of an increased level of light exposed to the eye 102. By using such physiological characteristics, the systems and methods described herein can detect a change in the pupillary response and compare that detected change to a biometric application threshold. If that detected change passes the biometric application threshold, the wearable display system may utilize the eye images or that detected pupillary response change for a biometric application.

The pupillary response (e.g., pupil parameter, change in a pupil parameter) can include a variety of physiological characteristics, including but not limited to a rise time for a pupillary response curve to an increased level of light, a decay time for the pupillary response curve to a decreased level of light, a delay time to an increased level of light, a rise curve for the rise time, or a decay curve for the decay time. Such a pupillary response can be measured by wearable display system coupled to processing modules (e.g., the wearable display system 100 shown in FIG. 2 or the display systems 100 in FIGS. 4 and 6). For example, processing modules 70, 72 can process eye images obtained from the imaging system 500 (see, e.g., FIG. 4) during the time period when the blue light level is being changed or modified. For example, eye images obtained from imaging system 500 may be used to form a model of the pupillary response. The model may be based on any parameter derived or measured from an eye image, including but not limited to: the pupil area, the pupil radius, the pupil circumference, the pupil diameter, or the outer iris radius relative to the pupil radius. Additionally, or alternatively, physiological characteristics of the pupillary response may be measured by various instruments coupled to the wearable display system 100 or derived from processing eye images. FIG. 7 schematically illustrates parameters representative of a pupillary response based on an eye image analysis of the processing modules 70, 72.

FIG. 7 illustrates an example pupillary response to light adjustment. The pupillary response curve 109 (r(t)) illustrates an example of a physiological response to changing levels of light 106 (L) for the radius of the pupil, r(t). As depicted in FIG. 7, the light levels instantaneously increase from level $L_A$ to a higher level, $L_A+L_B$, and then back down to the level $L_A$. The pupillary response curve 109, responding to varying levels of light 106, includes both a rise curve portion 109b and a decay curve portion 109d. The human eye 102 may experience a delay time $\tau_1$ 109a after the level of light has been increased. The rise curve portion 109b illustrates the pupillary response to an increased level of light (e.g., $L_A+L_B$) for a rise time $\tau_D$ 109c. In one embodiment, the increased level of light may correspond to an overall increase in the total amount of blue light exposed to the eye.

The pupil exhibits a particular response to decreased level of light (e.g., the eye 102 is exposed to a darker state due to light level $L_A+L_B$ changing to a lower level $L_A$). The decay curve portion 109d illustrates the pupillary response to a decreased level of light for a decay time $\tau_c$ 109e. A decay time delay 109f describes the elapsed time between when the increased level of light $L_A+L_B$ is returned to the level $L_A$ and when the pupil decay response begins. A difference in absolute level of pupillary response between a lighted and a darker state and/or between a darker and lighter state is described by 109g. In some embodiments, ratios of various values shown in FIG. 7 (e.g., 109a-109g) can be used to determine whether a threshold pupillary response has been reached. The various times associated with the pupillary response may be measured by a timer or clock implemented by the processing modules 70, 72 coupled to the wearable display system 100. The pupillary response to an adjusted level of blue light can include a variety of physiological characteristics, including but not limited to: a rise time for a pupillary response curve to the adjusted level of blue light, a decay time for the pupillary response curve to the adjusted level of blue light, a delay time to the adjusted level of blue light, a shape of the rise curve portion of the pupillary response curve to the adjusted level of blue light, or a shape of the decay curve portion of the pupillary response curve to the adjusted level of blue light. The pupillary response times are typically in the range from about 100 ms to about 500 ms. Although illustrated in FIG. 7 with respect to seven parameters (e.g., 109a-109g) for a pupillary response, other physiological characteristics of the pupillary response may be measured and included as a parameter of the pupillary response. For example, the minimum and maximum radius of the pupil can be included as parameters of the pupillary response. Accordingly, the physiological parameters illustrated in FIG. 7 are for illustration only, and the actual pupillary response for a human eye may be different than the example described above.

Changes in the pupillary response may be detected by wearable display system 100 implementing the blue light adjustment routines described herein. For example, processing modules 70, 72 may implement the routine 800 to adjust the level of blue light exposed to an eye 102 and compare the subsequent adjustment eye image received from the wearable display system 100 to an initial eye image received before the adjustment to the level of blue light occurred. For example, in one embodiment, detecting the change in the pupillary response may be a comparison of the pupil radius of the adjustment eye image to the pupil radius of the initial eye image. In another embodiment, the initial eye image may be a reference eye image that was stored in a biometric database for a particular individual that owns or accesses the wearable display system 100.

The system may capture one or more images of an object (e.g., eye) using an image capture device (e.g., camera). In some embodiments, a first image is captured under normal lighting conditions (e.g., an unmodified or unadjusted level of blue light directed into an eye) while a second (or third, fourth, etc.) image is captured under modified lighting conditions (e.g., an increased level of blue light directed into an eye). The image captured under the normal lighting conditions may be referred to as the control image, and the image(s) captured under the modified lighting conditions may be referred to as the modified image(s). Similarly, normal lighting conditions may be referred to as control lighting conditions.

Detected changes in the pupillary response, such as, for example, changes based on adjusted levels of blue light, may be utilized for certain biometric applications. A detected change in any of the physiological characteristics described above may indicate that an enhanced iris code may be generated from the adjustment eye image, because a larger portion of the iris can be imaged when the pupil is smaller. Accordingly, some biometric applications may require a detected change in the pupillary response to pass a biometric application threshold. Continuing in the same example of the pupil radii from above, determining whether the detected change passes the biometric application threshold may include determining that a difference of the pupil radius exceeds the biometric application threshold. In this example, the difference of the pupil radii corresponds to an image quality metric relating an image quality factor of the compared eye images (e.g., the initial eye image to the adjustment eye image). Other image quality metrics are possible as discussed below with respect to the Example of Biometric Application Thresholds.

In some implementations, a target state of the pupillary response is reached by incrementally adjusting the level of blue light (e.g., iterating the level of blue light) after an adjustment eye image has been analyzed for a change in the pupillary response. For example, the target state of the pupillary response may be a threshold pupil radius (e.g. sufficiently small to obtain a high quality iris image). If the adjustment eye image does not have a pupil radius that passes the threshold pupil radius, the level of blue light may be incrementally adjusted, e.g., to further constrict the pupil towards the target state of the pupillary response. From this perspective, each adjustment eye image received can be viewed as feedback to a system that optimizes for a target state of the pupillary response.

Additionally, or alternatively, the feedback, e.g. each adjustment image, may be used to regulate the pupillary response. For example, a model for the pupillary response for a particular individual may be formed using several eye images under varying conditions of light exposed to the eye. Once a model has been formed, the systems and methods described herein may be used to increase or decrease the level of blue light to regulate the pupillary response, thereby achieving a target state (e.g., an equilibrium state). An equilibrium state may be achieved by iteratively modifying the level of blue light. The equilibrium state may refer to a state when a predictable response is achieved by a given input (e.g., level of blue light). Such a target state may be helpful to achieve suitable results without producing an unnecessarily high level of blue light by the display.

Example of Modeling a Pupillary Response

The pupillary response to light or adjusted levels of blue light, described above in FIGS. 1A-1B and 7, may be used to form an individual biometric model for the individual utilizing the wearable display system 100. For example, processing modules 70, 72 may create an individual biometric model for an individual utilizing the wearable display system 100. To create this individual biometric model, information obtained from eye images may be used to contribute to that model, including but not limited to: a rise time for a pupillary response curve to an increased level of light, a decay time for the pupillary response curve to a decreased level of light, a delay time to an increased and/or decreased level of light, a rise curve for the rise time, or a decay curve for the decay time, a rise time for a pupillary response curve to the adjusted level of blue light, a decay time for the pupillary response curve to the adjusted level of blue light, a delay time to the adjusted level of blue light, a rise curve portion of the pupillary response curve to the adjusted level of blue light, or a decay curve portion of the pupillary response curve to the adjusted level of blue light. Accordingly, the individual biometric model may include a pupillary response under normal light conditions (e.g., ambient lighting conditions) and pupillary response under an adjusted level of blue light. The individual biometric model may also include reference eye images, such as eye images obtained under normal lighting conditions. Such reference eye images can be used for comparison to eye images obtained during or subsequent to an adjusted level of blue light. In embodiments with cameras having light sensors (e.g., as part of outward-facing imaging system 502) present on the wearable device, such cameras may be used to measure the ambient light level generally or specifically for wavelengths associated with blue light. Some such embodiments may be advantageous, because the display system has a measure of the level of ambient blue light and can change the level of blue light relative to the ambient level to induce a pupillary response in the viewer.

Cognitive Load

Additionally, or alternatively, the individual biometric model may also include pupillary responses defined by environmental conditions other than levels of light. The mental state of an individual can affect the individual's pupillary response. Accordingly, measurements of the pupillary response can be used to infer the individual's mental state at the time of the measurements. Cognitive load refers to the total amount of mental effort being used in an individual's working memory (e.g., the memory devoted to holding and processing information). Cognitive load may impact the pupillary response. An increased cognitive load may increase dilation of the pupil, corresponding to an increase of the pupil radius over time. Or as another example, the rise time of the pupillary response under conditions of high cognitive load may be shorter than the rise time under conditions of normal cognitive load. The exposure of a substantially soothing scene on an electronic display may reduce cognitive load and may give rise to measurable changes in the individual's pupillary response. Accordingly, the change of cognitive load may be measured by analyzing eye images for a change in pupillary response between time periods of high cognitive load (e.g., solving a problem, watching an action scene) and time periods when the user is experiencing lower cognitive load (e.g., after exposure to a substantially soothing scene).

As yet other examples of pupillary responses defined by environmental conditions, a pupillary response may be correlated to a state of the individual, including but not limited to: happiness, sadness, anger, disgust, fear, violent tendencies, arousal, or other emotions. For example, a shorter delay time for pupil constriction relative to normal lighting conditions may indicate anger for a particular individual. As another example, a sharp rise curve for pupil dilation may indicate arousal (e.g., from another individual). Pupillary responses for varying emotional states may vary for different individuals. Such pupillary responses may be included in the individual biometric model.

The individual biometric model may also be used to determine a level of cognitive load. As described above, the pupillary response may exist for an individual under "normal" lighting conditions, e.g., a normal pupillary response. Once that individual experiences an increased cognitive load (e.g., thinking about a math problem displayed on a wearable display system or thinking during a classroom exercise while utilizing a wearable display system), the level of the cognitive load may be determined. For example, the current pupillary response of the individual can be determined by eye imaging. The current pupillary response can be compared with the individual's normal pupillary response (e.g., under normal cognitive load and/or under normal lighting conditions). The normal pupillary response can be measured and stored by the display system. To estimate cognitive load, the normal pupillary response can be subtracted from the current pupillary response to generate a cognitive load pupillary response, which is a measure of the amount of the cognitive load currently experienced by the individual. Other distractors can be subtracted or compensated for (e.g., a difference in the current light level as compared to the light level under normal conditions). A greater (lesser) cognitive load pupillary response tends to indicate the individual is undergoing larger (smaller) cognitive activities. A level of cognitive load can be estimated based on the cognitive load pupillary response. For example, determining a level of cognitive load based on the cognitive load pupillary response may include correlating the pupil radius to a cognitive load score.

In various embodiments, the system may monitor the wearer's eyes to determine the wearer's cognitive load. This monitoring could occur continuously, at particular times (e.g., when the wearer is studying), or upon user activation of a cognitive load measurement application. The wearer's cognitive load can be stored and accessed by the wearer (or someone authorized by the wearer) for analysis. For example, a teacher may review a student's cognitive load while studying to determine whether the student is studying efficiently or day-dreaming. In other embodiments, the system may include an outward facing camera that can image the eyes of individuals nearby the wearer. The eye images of those individuals can be analyzed and cognitive load estimated. The system may display to the wearer a graphic indicating the other individual's cognitive loads. For example, a teacher may view students in a classroom and be able to obtain an estimate of cognitive load, which will tend to indicate which students are paying attention during class.

Once constructed, an individual biometric model may be stored in a biometric database. For example, processing modules 70, 72 may communicate via secure communication channel (e.g., the channel is encrypted) with a server hosting a biometric database. Biometric database may store the individual biometric model as a data record corresponding to that specific individual. In this way, the biometric database may store several biometric models obtained from various wearable display systems 100. Additionally, or alternatively, the individual biometric model may be stored locally (e.g., processing module 70). In such a case, the locally stored individual biometric model may be used for identification of an individual utilizing the wearable display system 100. For example, the wearable display system 100 may only allow access or partial access to an individual that matches the locally stored individual biometric model.

Example of Individual Identification with a Pupillary Response

The pupillary response to light or adjusted levels of blue light, described above in FIGS. 1A-1B and 7, may be used to identify an individual utilizing the wearable display system 100. Once the individual utilizing that wearable display system is identified, the system may allow access to certain biometric applications based on the associated pupillary response. For example, processing modules 70, 72 may determine that the pupillary response, alone or in conjunction with other biometric or non-biometric factors, identifies an individual utilizing the wearable display system 100. As but one example of processing modules 70, 72 making this determination, eye images obtained from a user utilizing a wearable display system 100 are analyzed for a rise time of a pupillary response curve to an increased level of light. That analysis is compared to a stored biometric record for a particular individual to determine whether that rise time corresponds to the rise time of the stored biometric record. Once it is determined that the rise curve does correspond to the rise curve of the stored biometric record, processing modules 70, 72 may allow access to certain biometric applications.

Illustratively, in one implementation of identifying a human individual, five or more biometric characteristics may be used to determine that the pupillary response identifies a specific human individual. Those five biometric or more characteristics may include a rise time for a pupillary response curve to an increased level of light, a decay time for the pupillary response curve to a decreased level of light, a delay time to an increased and/or decreased level of light, a maximum pupil radius, and/or a minimum pupil radius. When an individual attempts to utilize the wearable display system 100 that is associated with an individual biometric model having these five biometric characteristics (e.g., stored as a record in local processing module 70), eye images are obtained to determine these five biometric characteristics, while preventing further access to any biometric applications that are part of the wearable display system. For example, levels of blue light may be adjusted while the eye images are obtained. Once the pupillary response is determined for this individual, each biometric characteristic may be compared to the stored characteristic to determine whether access to a biometric application should be allowed, e.g., by comparing an image quality metric to a biometric application threshold, as described above. In some implementations, a set of biometric characteristics, such as the five or more biometric characteristics described, may be referred to as a biometric vector. Additionally or alternatively, some implementations may obtain an extended biometric vector, which includes the set of biometric characteristics for each eye. Such biometric measurements (e.g., a biometric vector) may be utilized in conjunction with other biometric or non-biometric metrics for verifying the identity of the user.

Some advantages of storing a biometric characteristic corresponding to a specific human individual may include improving the security of the wearable display system. For example, an unauthorized individual may attempt to gain access to the display system and/or system application by imitating (also known as spoofing) the biometric characteristics of an actual authorized user. For example, an unauthorized individual seeking to achieve illicit access to wearable display system may present to the display system a picture (or a 3D model) of the iris of the authorized user. One system application may be projecting images onto the display for a user as if the images appear at different distances from the user. Other examples may include software that allow a user to engage with the Internet, software applications ("apps"), system settings, system security features, etc. The display system may image the iris picture or model and be fooled into permitting access to the unauthorized individual. As another example of improving the security of the wearable display, start-up routines for a wearable display system may incorporate a scene that stimulates the pupillary response. For example, as part of a startup routine that initiates the wearable display system, the display can project an image of a sunrise, where the sky increasingly becomes more blue. Such a scene can stimulate or trigger the pupillary response of the individual wearing the system, so that the wearable display can measure the wearer's pupillary response (e.g., in response to the bluing of the sky) and use the measured response to identify the wearer or determine the wearer is a living individual (e.g., anti-spoofing). Such a "sunrise" scenario is not limited to startup and can be used at other times when identification or other biometric applications are desired. Further, the image of a sunrise is a non-limiting example, and in other cases, other types of images (e.g., with time-varying bluing) can be used. However, using the system and methods described herein, such spoofing may be reduced. Pupillary responses identify specific physiological responses and parameters that only a living human individual, and not a fixed image or 3D model, can replicate. Moreover, the pupillary response can be specific to one human individual, and not duplicated by another, analogous to a human fingerprint. Accordingly, identification of a specific, living, human individual may be facilitated by the determination of a pupillary response for their eye and corresponding biometric characteristics associated with that response, such as the information obtained to construct an individual biometric model, described above.

Processing modules 70, 72 may also determine that the pupillary response corresponds to specific individuals or specific types of individuals. Access to biometric applications may be granted or denied based on the type of individual identified. Various types of individuals may be identified by their respective pupillary response. In one implementation, access may be denied to a human eye that matches some biometric characteristics, but not others. For example, a deceased human eye may be distinguished from a living human eye based on the pupillary response. Illustratively, an eye from a deceased human will not display any pupillary response to changing light levels, whereas an eye in a living human will display a pupillary response. As additional examples of types of individuals that may be identified by the pupillary response, pupillary responses can indicate various physiological states of an individual, including but not limited to: an unconscious human individual, a sleeping individual, a tired individual, an inebriated individual, an elderly individual, an injured individual, an individual undergoing stress or other emotions, or an individual under the influence of reflex or cognitively impairing substances. As an example, access to a financial biometric application may not be granted to an inebriated individual, as identified by their pupillary response.

Pupillary responses may also be used to contribute to measurement of other physiological states of an individual such as performing a medical diagnosis. For example, a long delay time for an eye exposed to an adjusted level of blue light may indicate a certain eye disease or human malady. Accordingly, a clinician may use one or more biometric characteristics identified from the pupillary response to assist in a medical diagnosis of an individual utilizing the wearable display system 100.

Example of Blue Light Pupillary Response Routine

Figure 8:
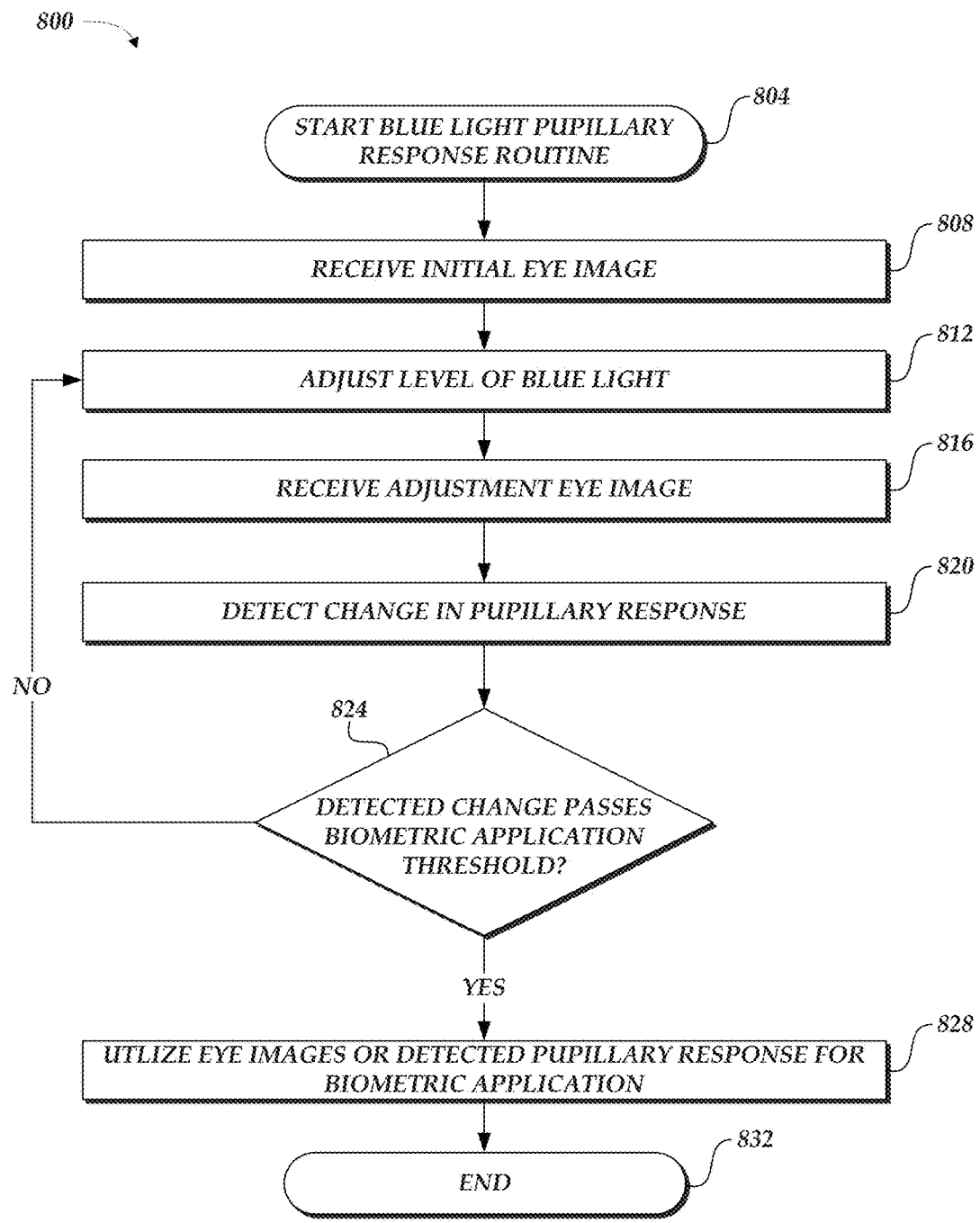
FIG. 8 schematically illustrates an example of a blue light pupillary response routine.

FIG. 8 schematically illustrates an example of a blue light pupillary response routine. The routine 800 depicts an example flow for adjusting a level of blue light, detecting a change in the pupillary response, determining whether the detected change in pupillary response passes a biometric application threshold in utilizing the detected pupillary response for a biometric application. For example, the routine 800 can be implemented by the wearable display system 100 via the processing modules 70, 72.

The routine 800 begins at block 804. At block 808, an initial eye image is received. The eye image can be received from a variety of sources including, but not limited to: an image capture device, a head mounted display system, a server, a non-transitory computer-readable medium, or a client computing device (e.g., a smartphone). In some implementations, receiving an initial eye image is an optional step. The initial eye image may be a reference image, such as a reference eye image stored in a biometric database as a biometric record.

Continuing in the routine 800, at block 812, the level of blue light exposed to the eye 102 is adjusted. For example, the display of a wearable display system 100 may be adjusted so that more blue colors are displayed. Illustratively, certain areas of the display can be converted to blue pixels from another non-blue pixel. Other ways to adjust the level of blue light are possible, as described above with respect to the example of an eye experiencing blue light adjustment. During this blue light adjustment or subsequent to the blue light adjustment, additional eye images may be received. In this implementation, at block 816, an adjustment eye image is received. That is, the eye image received during or subsequent to the blue light adjustment is received by the wearable display system 100, e.g., via an image capture device. For example, the adjustment eye image may be received as described above with respect to receiving an initial eye image at block 808.

At block 820, a change in the pupillary response is detected. As described above with respect to the example of a pupillary response to blue light adjustment, changes in the pupillary response may be detected by analyzing various physiological responses, such as a rise time for a pupillary response curve to an increased level of light. For example, a change in the pupillary response may be detected by comparing the initial eye image to the adjustment eye image. Once the change in the pupillary response is detected, the flow of routine 800 proceeds to decision block 824. At decision block 824, the detected change is compared to a biometric application threshold to determine whether the detected change passes that threshold. As described above with respect to the example of a pupillary response to blue light adjustment, various image quality metrics are possible to represent the detected change pupillary response. In addition, various biometric application thresholds that correspond to a respective image quality metrics are possible. If an image quality metric representing the detected change does not pass the biometric application threshold, the flow proceeds back to block 812, where the level of blue light may be adjusted further. If, however, an image quality metric representing the detected change passes the biometric application threshold, the flow proceeds to block 828.

At block 828, the image quality metric representing the detected change or the received eye images, including the adjustment eye images, may be utilized for a biometric application. For example, in one embodiment, the detected change in pupillary response may be used to identify whether an individual is human. As yet another example, a biometric characteristic of the pupillary response may be utilized to identify a specific human individual. In yet other embodiments, the eye images received may be utilized to determine an eye pose or an iris code for the associated eye. The biometric characteristic may include a state of an individual, such as, for example, whether the individual is inebriated, is partially or fully awake, is under partial or heavy cognitive load, is under the influence of mind- or awareness-altering substances, and/or is unconscious. Thereafter, at block 828, the routine 800 ends.

In various embodiments, the routine 800 may be performed by a hardware processor (e.g., the processing modules 70, 72 or the controller 210) of a display system such as embodiments of the display system 100. In other embodiments, a remote computing device with computer-executable instructions can cause the head mounted display system to perform the routine 800. For example, the remote computing device can be caused to detect a change in pupillary response at block 820, while the local processing module 70 may be caused to perform other steps in the routine 800.

Example of a Blue Light Identification Routine

Figure 9:
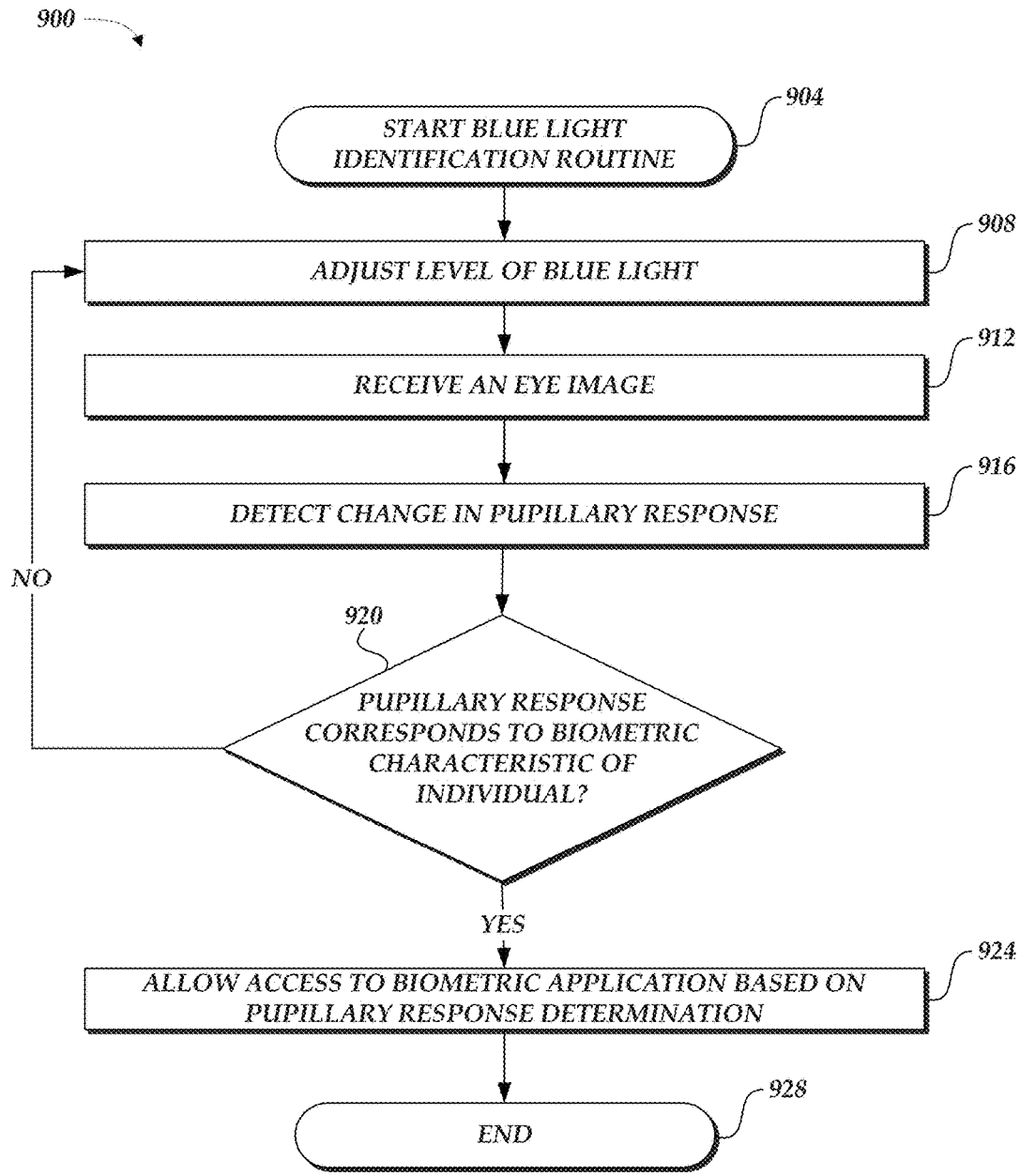
FIG. 9 schematically illustrates an example of a blue light identification routine.

FIG. 9 schematically illustrates an example of a blue light identification routine. The routine 900 depicts an example flow for adjusting a level of blue light, detecting a change in the pupillary response, determining whether a biometric characteristic of the pupillary response identifies an individual, and allowing access to a biometric application based on the pupillary response identification. For example, the routine 900 can be implemented by the wearable display system 100 via the processing modules 70, 72.

The routine 900 begins at block 904. At block 908, the level of blue light exposed to the eye 102 is adjusted. For example, the display of a wearable display system 100 may be adjusted so that more blue colors are displayed. Illustratively, certain areas of the display can be converted to blue pixels from another non-blue pixel. Other ways to adjust the level of blue light are possible, as described above with respect to the example of an eye experiencing blue light adjustment. During this blue light adjustment and/or subsequent to the blue light adjustment, an eye image is received.

In this implementation, at block 912, an eye image is received. For example, an eye image can be received from a variety of sources including, but not limited to: an image capture device, a head mounted display system, a server, a non-transitory computer-readable medium, or a client computing device (e.g., a smartphone). Optionally, several eye images may be received over a time period. For example, the time period may correspond to a period over which the blue light is incrementally increased. As another example, the time period may correspond to a finite period subsequent to the blue light adjustment.

At block 916, a change in the pupillary response is detected. As described above with respect to the example of a pupillary response to blue light adjustment, changes in the pupillary response may be detected by analyzing various physiological responses, such as a rise time for a pupillary response curve to an increased level of light. For example, a change in the pupillary response may be detected by comparing the received eye image to a reference eye image. In one embodiment, the received eye image may be compared to several reference eye images to detect the change in pupillary response over a time period. Once the change in the pupillary response is detected, the flow of routine 900 proceeds to decision block 920. At decision block 920, the detected change in pupillary response or the pupillary response itself is compared to biometric characteristics of an individual. For example, the detected change in the pupillary response may be compared to several biometric models stored as records in a biometric database. As described above with respect to the example of individual identification with a pupillary response, various individual identifications are possible, including but not limited to: identifications of human individuals, identifications of types and/or classes of individuals, and identifications of certain biometric characteristics associated with the pupillary response. If the pupillary response corresponds to a biometric characteristic of an individual, the flow proceeds back to block 908, where the level of blue light may be adjusted further. If, however, the pupillary response does not correspond to a biometric characteristic of a human individual, the flow proceeds to block 920.

At block 924, a pupillary response determination that corresponds a biometric characteristic to a specific individual may allow access to a biometric application. For example, in one embodiment, the identification of human individual allows access to all biometric applications associated with a wearable display system 100. As yet another example, an identification of an inebriated individual allows access only to non-financial biometric applications. Thereafter, at block 924, the routine 900 ends.

In various embodiments, the routine 900 may be performed by a hardware processor (e.g., the processing modules 70, 72 or the controller 210) of a display system such as embodiments of the display system 100. In other embodiments, a remote computing device with computer-executable instructions can cause the head mounted display system to perform the routine 900. For example, the remote computing device can be caused to detect a change in pupillary response at block 916, while the local processing module 70 may be caused to perform other steps in the routine 900.

Additional Example of Blue Light Pupillary Response Routine

Figure 10:
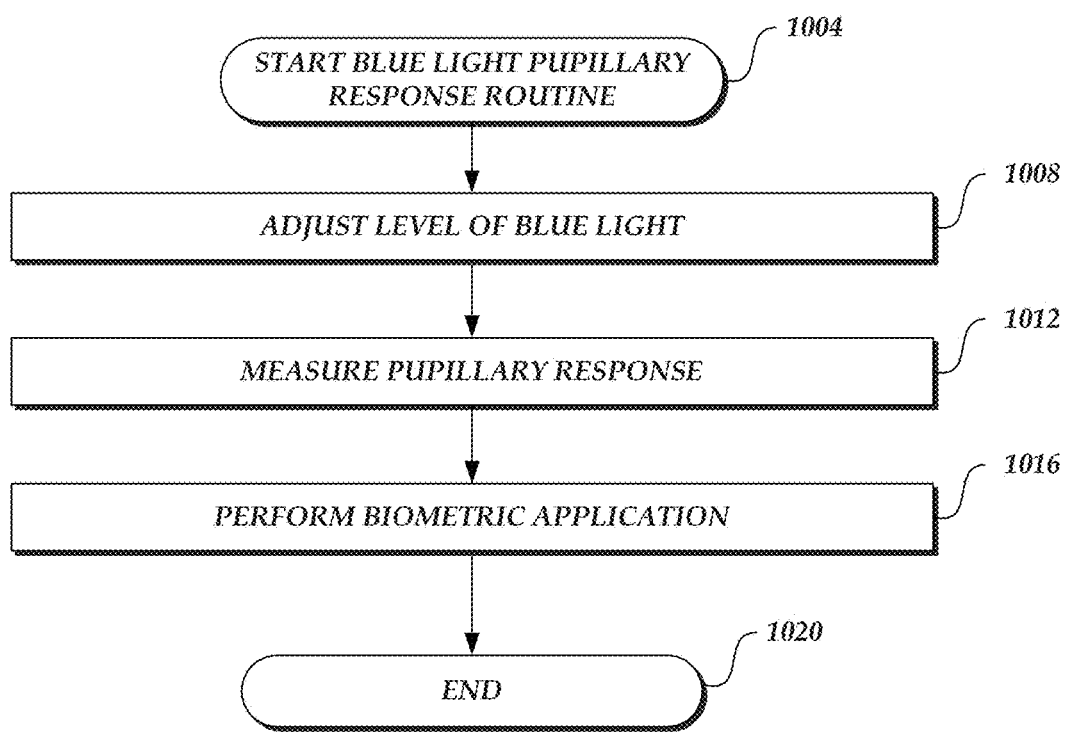
FIG. 10 schematically illustrates an example of a blue light pupillary response routine.

FIG. 10 schematically illustrates an example of a blue light pupillary response routine. The routine 1000 depicts an example flow for adjusting a level of blue light, measuring the pupillary response, performing a biometric application. For example, the routine 1000 can be implemented by the wearable display system 100 via the processing modules 70, 72.

The routine 1000 begins at block 1004. At block 1008, the level of blue light exposed to the eye 102 is adjusted. For example, the display of a wearable display system 100 may be adjusted so that more blue colors are displayed. Illustratively, certain areas of the display can be converted to blue pixels from another non-blue pixel. Other ways to adjust the level of blue light are possible, as described above with respect to the example of an eye experiencing blue light adjustment. In some implementations, at block 1008, eye images are received during a time period. For example, the time period may correspond to a period of blue light adjustment. As another example, the time period may correspond to a finite period subsequent to the blue light adjustment. The eye images can be received from a variety of sources including, but not limited to: an image capture device, a head mounted display system, a server, a non-transitory computer-readable medium, or a client computing device (e.g., a smartphone).

At block 1012, a pupillary response is measured. As described above with respect to the example of a pupillary response to blue light adjustment and an eye experiencing blue light adjustment, the pupillary response may be measured by detecting various physiological responses, such as a rise time for a pupillary response curve to an increased level of light or the maximum radius of the pupil. Once measured, the flow of routine 1000 proceeds to decision block 1016. In some implementations, the measured pupillary response may be represented by image quality metrics for comparisons to biometric application thresholds or identification of biometric characteristics. In some implementations, block 1012 is an optional step.

At block 1016, a biometric application is performed. For example, the local processing module 70 of the wearable display system 100 may implement an iris code generation routine utilizing eye images obtained during the blue light adjustment. As yet another example, processing modules 70 may perform a biometric identification routine utilizing eye images obtained during the blue light adjustment. Examples of biometric applications include, but are not limited to, generating an iris code, determining a cognitive response, authorizing access to the head mounted display system, identifying a wearer of the head mounted display system, displaying information associated with an individual associated with the determined pupillary response, or determining a physiological state of the wearer of the head mounted display system. For example, by using the blue light adjustment techniques described herein, the display system may be able to identify that a wearer is an individual authorized to use the display system and present (e.g., by the display or by an audio device) a message (e.g., "Welcome, Adrian"). If the wearer is determined to be an individual not authorized to use the device, the system may present a different message (e.g., "You are not authorized to use the display," or, if the user is identified, but not authorized, "Andrew, this is Adrian's display"). Thereafter, at block 1020, the routine 1000 ends.

In various embodiments, the routine 1000 may be performed by a hardware processor (e.g., the processing modules 70, 72 or the controller 210) of a display system such as embodiments of the display system 100. In other embodiments, a remote computing device with computer-executable instructions can cause the head mounted display system to perform the routine 1000. For example, the remote computing device can be caused to adjust the level of blue light at block 1008, while the local processing module 70 may be caused to perform biometric application at block 1016.

Example of Biometric Application Thresholds

As described herein, by increasing the level of blue light to an eye, the pupil constricts, and the area of the iris increases, which permits better imaging of the iris. The level of blue light may be changed as eye images are taken until an eye image passes a biometric application quality threshold in order to obtain high quality iris image(s) for various biometric applications (e.g., iris codes).

The biometric application threshold (Q) may share a relationship with a specific quality level of an image quality metric for an eye image. An eye image can have various quality factors associated with the image including, but not limited to: resolution (e.g., iris resolution), focus, defocus, sharpness, blur, unoccluded pixels or occluded pixels (e.g., occluded by eye lashes or eyelids), glare, glints (e.g., corneal reflections, from natural or artificial sources), noise, dynamic range, tone reproduction, luminance, contrast (e.g., gamma), color accuracy, color saturation, whiteness, distortion, vignetting, exposure accuracy, lateral chromatic aberration, lens flare, artifacts (e.g., software processing artifacts such as during RAW conversion), and color moiré. One or more of these image quality factors may have an image quality metric associated with a measure of the quality factor. An image quality metric for several eye images can be computed or processed in processing modules 70, 72. As but one example, the processing modules 70, 72 can determine an image quality metric associated with an adjustment eye image (e.g., an eye image obtained after an adjustment to the level of blue light). Accordingly, a relationship can be determined between a certain quality metric and the pupillary response represented by at least two eye images (e.g., by calibration using a standard or control eye image). For example, one or more image quality metrics can have an associated biometric application threshold, Q. In some embodiments, a reference eye image may be used to determine the biometric application threshold, Q.

Illustratively, the resolution of an eye image (e.g., a quality metric) can be expressed in terms of the resolution of the iris, with the resolution of the iris being expressed as a distance in pixels. In many applications, to capture the iris details, the radial resolution of the iris is greater than about 70 pixels and may be in a range from 80 to 200 pixels. For example, the biometric application threshold can be 130 pixels for the radius of the iris. In one embodiment, this biometric application threshold of 130 pixels can be determined from a reference eye image. For example, the threshold may be set as a fraction of the observed (measured) radius of the iris. Continuing in this example, an initial eye image with the radius of the iris being 110 pixels can be compared to this biometric application threshold of 130 pixels for the radius of the iris. Such an image would not pass the threshold, and thus not be utilized in a biometric application or utilized in eye image processing. However, if an adjustment eye image (e.g., adjusted with increased levels of blue light) has a radius of the iris being 150 pixels (e.g., due to the constriction of the pupil), the adjustment eye image may pass the biometric application threshold and may be utilized in a biometric application or utilized in eye image processing. For example, the adjustment eye image can be used to generate an iris code. In some implementations, the image quality metric can be a percentage of the iris that is visible between the eyelids. For example, a percentage lower than 50% can indicate the eye is in blink or that a user is not in a fully functional cognitive state (e.g., the user is sleepy, unconscious, medicated, inebriated, under cognitive load). Thus, images can be selected if the image quality metric passes an image quality threshold (e.g., 60%, 70%, 75%, 80%, 90% or higher). As illustrated with these examples, any eye image can be used to compute an image quality metric (e.g., a real valued number), q, that reflects the quality of the eye image.

Accordingly, with the utilization of biometric application thresholds, any eye image with a computed image quality metric can be used detect changes in the pupillary response (e.g., comparing two eye images) or the state of the pupillary response (e.g., analyzing a single eye image for identification of an individual characteristic). In many cases, q is higher for images of higher quality (e.g., q for unoccluded pixels may increase as the amount of unoccluded pixels increases), and high quality images include those that have a q value that passes (increases above) a biometric application threshold, Q. In other cases, q is lower for images of higher quality (e.g., q for occluded pixels may decrease as the amount of occluded pixels decreases), and high quality images include those that have a q value that passes (decreases below) a biometric application threshold, Q.

In some implementations, the quality metric for an eye image may be a combination of a plurality of component quality metrics calculated for the image. For example, the quality metric for an eye image can be a weighted sum of various component quality metrics. Such a quality metric may advantageously quantify different types of image qualities (e.g., amount of unoccluded pixels, resolution, and focus) into a single, overall measure of image quality.

In some cases, perspective correction can be applied to the eye images (e.g., to reduce the effect of a perspective between the imaging camera and the eye). For example, eye images can be perspective corrected so that the eye appears to be viewed straight on rather than from an angle. Perspective correction can improve the quality of the eye images and in some cases, the quality metric(s) are calculated from the perspective-corrected eye images.

As can be seen from these examples, the biometric application threshold can relate the image quality of an adjustment eye image to subsequent utilization of that eye image in a biometric application. For example, adjustment eye images that pass the biometric application threshold may be utilized in a biometric application, while adjustment eye images that do not pass the biometric application threshold will not be utilized. For example, with an adjustment eye image having passed a biometric application threshold, the adjustment eye image may be utilized in a biometric application, such as performing a biometric data operation on a set of eye images to obtain biometric information. Or as another example, a biometric application may be performing a pose estimation or iris code generation based on the adjustment eye image. Any such biometric application techniques can be used in conjunction with the techniques and system described herein. For example, as described above in FIG. 8, the routine 800 depicts an example flow for processing of such eye images to determine whether they pass a biometric application threshold and whether to utilize such images in a biometric application (e.g. identification of an individual).

Example Embodiments

The blue light adjustment techniques described here in can be applied to an electronic display or any wearable display system. Blue light adjustment techniques can be viewed together as a single process and/or methodology for processing an image of an eye.

Accordingly, at least the following embodiments are contemplated.

(1) An apparatus comprising a camera that takes an image of an eye. The camera can be a digital camera. The apparatus further comprises a display and a processing system that work in conjunction to adjust the level of blue light.

(2) The embodiment in (1), in which (a) an increasingly large area of the display is converted to blue pixels or (b) (2) all pixels of the display are shifted toward the blue from their existing color.

The techniques (2)(a) and (2)(b) can be performed sequentially or as part of a simultaneous combination.

(3) The embodiment in any of (1) or (2), in which the processing system controls the blue light as a means of explicitly controlling the user's pupil dilation state.

(4) The embodiment in any of (1) to (3), in which the processing system includes feedback control as the pupil dilation state is measured (e.g. by analyzing the images from the same camera which is being used for iris code extraction), and adjusts the blue light level until a target equilibrium state is achieved. For example, an eye image may be analyzed from a camera utilized for iris code extraction.

(5) The embodiment in any of (1) to (4), in which the processing system identifies a high degree of confidence is needed in iris code construction. For example, a high degree of confidence may be needed for original enrollment in a biometric system or when a financial transaction is being made. That is, the degree of confidence for original enrollment in a biometric system or such a financial transaction passes a confidence threshold.

(6) The embodiment in any of (1) to (5), in which the processing systems measures the pupillary response or the maximum dilation state (or both) as a means of verifying the identity of the user.

(7) The embodiment in any of (1) to (6), in which the processing system (a) measures the pupillary response the measurement of five parameters including the maximum and minimum dilation radii, the pupillary response delay, and the two parameters that characterize the adaptation curves of the pupil when the light level is raised or lowered; and (b) verifies that the five parameters are within the range of possibility for a human subject as a means of verifying that a live human being is the subject of an iris identification system.

(8) The embodiment in any of (1) to (7), in which the processing system uses the five parameters as a means of identification.

(9) The embodiment in any of (1) to (8), in which the processing system models the behavior of the pupil, including the behavior of the pupil as it adapts as function of time after a change in illumination.

(10) The embodiment in any of (1) to (9), in which the processing system identifies parameters of the model for the behavior of the pupil.

(11) The embodiment in any of (1) to (10), in which the processing system calculates the identified parameters of the model for the behavior of the pupil for each eye of a human individual.

(12) The embodiment in any of (1) to (11), in which the processing system uses the pupillary light reflex (e.g., pupillary response) as a means of distinguishing living persons from deceased persons.

(13) The embodiment in any of (1) to (12), in which the processing system uses the pupillary light reflex (e.g., pupillary response) as a means of identifying persons who are unconscious, asleep, tired, inebriated, or otherwise under the influence of reflex or cognitive impairment substances.

Additional Aspects

In a 1st aspect, a head mounted display system configured to project variable levels of blue light to an eye of a user is disclosed. The display system comprises: a frame configured to be wearable on the head of the user; a display configured to project at least blue light into the eye of the user and to modify an intensity of the blue light relative to an intensity of non-blue light; a camera configured to capture a first image of the eye while the display projects light at a first ratio of intensity of blue light to non-blue light into the eye and configured to capture a second image of the eye while the display projects a second ratio of intensity of blue light to non-blue light different from the first ratio into the eye; and a hardware processor programmed to: analyze an image from the camera to determine a change in a pupil parameter between the reference image and the survey image passes a biometric application threshold; based at least in part on the determined change, instruct the display to modify a ratio of the intensity of blue light to non-blue light; determine that the change in the pupil parameter between the second image and the first image matches a biometric characteristic of a human individual; and determine an identity of the human individual.

In a 2nd aspect, the head mounted display system of aspect 1, wherein the display comprises a scanning fiber projector.

In a 3rd aspect, the head mounted display system of aspect 1 or aspect 2, wherein the hardware processor is programmed to restrict access to a system application if the identity of the individual does not match an identity of an individual authorized to use the system application.

In a 4th aspect, the head mounted display system of aspect 3, wherein the system application comprises displaying images as if at a plurality of depths.

In a 5th aspect, the head mounted display system of any one of aspects 1 to 4, wherein the display is configured to modify the intensity of light in a wavelength range of between about 445 nm and 525 nm.

In a 6th aspect, the head mounted display system of any one of aspects 1 to 5, wherein the display is configured to increase the second ratio of intensity of blue light to non-blue light by flashing blue light for longer than 10 ms.

In a 7th aspect, the head mounted display system of any one of aspects 1 to 6, wherein the display is configured to project light at two or more colors.

In a 8th aspect, the head mounted display system of any one of aspects 1 to 7, wherein the display is configured to display content as if at a plurality of depths from a user.

In a 9th aspect, the head mounted display system of any one of aspects 1 to 8, wherein the display comprises a plurality of stacked waveguides.

In a 10th aspect, the head mounted display system of any one of aspects 1 to 9, wherein to instruct the display to modify the intensity of blue light relative to non-blue light, the hardware processor is programmed to instruct an image injection device to increase a proportion of blue light injected into a corresponding stacked waveguide of the plurality of stacked waveguides.

In a 11th aspect, the head mounted display system of any one of aspects 1 to 10, wherein the hardware processor is further configured to form an individual biometric model comprising at least one of a first rise time of a pupillary response to the first ratio of intensity of blue light to intensity of non-blue light, a first decay time of the pupillary response to the first ratio of intensity of blue light to intensity of non-blue light, a first delay time of a pupillary response to the first ratio of intensity of blue light to intensity of non-blue light, a first rise curve of the pupillary response to the first ratio of intensity of blue light to intensity of non-blue light, a first decay curve of a pupillary response to the first ratio of intensity of blue light to intensity of non-blue light, a second rise time of a pupillary response to the second ratio of intensity of blue light to intensity of non-blue light, a second decay time of the pupillary response to the second ratio of intensity of blue light to intensity of non-blue light, a second delay time of a pupillary response to the second ratio of intensity of blue light to intensity of non-blue light, a second rise curve of the pupillary response to the second ratio of intensity of blue light to intensity of non-blue light, or a second decay curve of a pupillary response to the second ratio of intensity of blue light to intensity of non-blue light.

In a 12th aspect, the head mounted display system of any one of aspects 1 to 11, wherein the hardware processor is programmed to calculate a cognitive load score based on the change in the pupil parameter.

In a 13th aspect, the head mounted display system of any one of aspects 1 to 12, wherein the change in the pupil parameter comprises an increased pupil radius.

In a 14th aspect, the head mounted display system of any one of aspects 1 to 13, wherein the hardware processor is programmed to: determine a current change in the pupil parameter of the individual wearing the head mounted display system; correlate the current change in the pupil parameter with a modelled change in the pupil parameter of an individual biometric model to generate a cognitive load pupillary response, wherein the modelled change comprises a change in a pupil parameter under a normal cognitive load; determine a level of cognitive load based on the cognitive load pupillary response.

In a 15th aspect, a method for identifying a human individual using a wearable display system comprising a camera coupled to computing hardware, the wearable display system comprising a stack of waveguides configured to direct light into the eye is disclosed. The method comprises: directing reference light comprising a first ratio of an intensity of blue light to an intensity of non-blue light into the eye; using the camera, capturing a first image of the eye while reference light is directed into the eye; directing modified light comprising a second ratio of an intensity of blue light to an intensity of non-blue light different from the first ratio into the eye; using the camera, capturing a second image of the eye while modified light is directed into the eye; detecting a change in a pupil parameter of the eye between the first image and the second image; determining that the detected change in the pupil parameter matches to a biometric characteristic of a human individual; and identifying the human individual.

In a 16th aspect, the method of aspect 15 further comprising the steps of allowing access to a system application based on the detected change in the pupil parameter.

In a 17th aspect, the method of aspect 16 or aspect 15, wherein allowing access to a system application based on the detected change in the pupil parameter comprises at least one of determining a cognitive load, estimating an eye pose, generating an iris code, or determining an emotional response.

In a 18th aspect, the method of any one of aspects 15 to 17, wherein the pupil parameter comprises at least one of a maximum radius of the pupil, a minimum radius of the pupil, a rise time of the pupillary response to the second ratio of intensity of blue light to intensity of non-blue light, a decay time of a pupillary response to the second ratio of intensity of blue light to intensity of non-blue light, or a delay time of a pupillary response to the second ratio of intensity of blue light to intensity of non-blue light.

In a 19th aspect, the method of any one of aspects 15 to 18, further comprising determining that the detected change in the pupil parameter matches a change in pupil parameter of at least one of an unconscious human individual, a sleeping individual, a tired individual, an inebriated individual, or an individual under the influence of cognition-impairing substances.

In a 20th aspect, the method of any one of aspects 15 to 19, further comprising the step of determining that an image quality metric measured from the second image exceeds an image quality threshold, the image quality metric comprising a distance between a part of the eye and an eyelid.

In a 21st aspect, a head mounted display system configured to project variable levels of blue light to an eye of a user is disclosed. The display system comprises: a frame configured to be wearable on the head of the user; a display comprising configured to project at least blue light into the eye of the user and to modify an intensity of the blue light relative to an intensity of non-blue light; a camera configured to capture a first image of the eye while the display projects light at a first ratio of intensity of blue light to non-blue light into the eye and configured to capture a second image of the eye while the display projects a second ratio of intensity of blue light to non-blue light different from the first ratio into the eye; and a hardware processor programmed to: analyze an image from the camera to determine whether a change in a pupil parameter between the second image and the first image passes a biometric application threshold; based at least in part on the determined change, instruct the display to modify a ratio of the intensity of blue light to non-blue light; determine that the change in the pupil parameter between the second image and the first image passes a biometric application threshold; and perform a biometric application in response to the determination.

In a 22nd aspect, the head mounted display system of aspect 21, wherein the display is configured to modify the intensity of light in a wavelength range of between about 445 nm and 525 nm.

In a 23rd aspect, the head mounted display system of aspect 21 or aspect 22, wherein the hardware processor is programmed to increase a number of pixels of the display projecting blue light during the first image relative to the number of pixels of the display projecting blue light during the second image.

In a 24th aspect, the head mounted display system of any one of aspects 21 to 23, wherein the display is configured to display content as if at a plurality of depths from a user.

In a 25th aspect, the head mounted display system of any one of aspects 21 to 24, wherein the display comprises a scanning fiber projector.

In a 26th aspect, the head mounted display system of any one of aspects 21 to 25, wherein the display is configured to present a light field image to the user.

In a 27th aspect, the head mounted display system of any one of aspects 21 to 26, wherein the system comprises a plurality of stacked waveguides.

In a 28th aspect, the head mounted display system of any one of aspects 21 to 27, wherein to instruct the display to modify the intensity of blue light relative to non-blue light, the hardware processor is programmed to instruct an image injection device to increase a ratio of blue light injected into a corresponding stacked waveguide of the plurality of stacked waveguides.

In a 29th aspect, the head mounted display system of any one of aspects 21 to 28, wherein the pupil parameter comprises at least one of a maximum radius of the pupil, a minimum radius of the pupil, a rise time of the pupillary response to the second ratio of intensity of blue light to intensity of non-blue light, a decay time of a pupillary response to the second ratio of intensity of blue light to intensity of non-blue light, or a delay time of a pupillary response to the second ratio of intensity of blue light to intensity of non-blue light.

In a 30th aspect, the head mounted display system of any one of aspects 21 to 29, wherein the pupil parameter comprises a circumference of the pupil.

In a 31st aspect, the head mounted display system of any one of aspects 21 to 30, wherein the change in the pupil parameter comprises at least one of a rise curve for the rise time of the pupillary response to the second ratio of intensity of blue light to intensity of non-blue light or a decay curve for the decay time of the pupillary response to the second ratio of intensity of blue light to intensity of non-blue light.

In a 32rd aspect, the head mounted display system of any one of aspects 21 to 31, wherein the biometric application comprises at least one of generating an iris code, determining a cognitive response, authorizing access to the head mounted display system, identifying a user of the head mounted display system, displaying information associated with an individual associated with the determined pupillary response, or determining a physiological state of the user of the head mounted display system.

In a 33rd aspect, the head mounted display system of any one of aspects 21 to 32, wherein the hardware processor is programmed to present, during a start-up of software for the head mounted display system, an image that changes in intensity of blue light.

In a 34th aspect, the head mounted display system of aspect 33, wherein the hardware processor is programmed to measure a change in the pupil parameter during the start-up of the software, and perform a biometric identification action.

In a 35th aspect, the head mounted display system of aspect 34, wherein performing the biometric identification action comprises at least one of identifying the user of the display system, determining that the user of the display system is a living individual, determining that the user of the display system is authorized to use the display system, or displaying information that is associated with an individual having the measured change in pupil parameter.

In a 36th aspect, a method for identifying a human individual using a wearable display system comprising a camera coupled to computing hardware, the wearable display system comprising a stack of waveguides configured to direct light into the eye is disclosed. The method comprises: directing reference light comprising a first ratio of an intensity of blue light to an intensity of non-blue light into the eye; using the camera, capturing a first image of the eye while the reference light is directed into the eye; directing modified light comprising a second ratio of an intensity of blue light to an intensity of non-blue light different from the first ratio into the eye; using the camera, capturing a second image of the eye while the modified light is directed into the eye; detecting a change in a pupil parameter of the eye between the second image and the first image; determining that the detected change in the pupil parameter passes a biometric application threshold; and performing a biometric application.

In a 37th aspect, the method of aspect 36, wherein directing modified light into the eye comprises increasing the intensity of blue light relative to the reference light.

In a 38th aspect, the method of aspect 36 or aspect 37, wherein increasing the intensity of blue light comprises flashing blue light for longer than 10 ms.

In a 39th aspect, the method of any one of aspects 36 to 38, wherein detecting the change in the pupil parameter of the eye between the second image and the first image comprises comparing a pupil radius of the first image to a pupil radius of the second image, wherein determining that the detected change in the pupil parameter passes the biometric application threshold comprises determining that a difference in the pupil radius exceeds the biometric application threshold.

In a 40th aspect, the method of any one of aspects 36 to 40, further comprising the step of determining that an image quality metric measured from the first image exceeds an image quality threshold, the image quality metric comprising a distance between a part of the eye and an eyelid.

In a 41st aspect, a method for adjusting a level of blue light exposed to an eye is disclosed. The method comprises: under control of computing hardware: receiving an initial eye image obtained by an image capture device; adjusting a level of blue light exposed to an eye associated with the initial eye image; receiving an adjustment eye image of the eye exposed to the adjusted level of blue light; detecting a change in a pupillary response of the adjustment eye image relative to the initial eye image; determining that the detected change in the pupillary response passes a biometric application threshold; and performing a biometric application.

In a 42nd aspect, the method of aspect 41, wherein adjusting the level of blue light exposed to the eye comprises increasing the level of blue light.

In a 43rd aspect, the method of aspect 41 or aspect 42, wherein increasing the level of blue light corresponds to at least one of flashing blue light for a time period, pulsing blue light for a time period, increasing areas of a display to blue pixels, shifting displayed pixels of a display to increased blue values, or increasing an amount of blue pixels in a display.

In a 44th aspect, the method of any one of aspects 41-43, wherein detecting the change in the pupillary response of the adjustment eye image relative to the initial eye image comprises comparing a pupil radius of the adjustment eye image to a pupil radius of the initial eye image.

In a 45th aspect, the method of aspect 44, wherein determining that the detected change in the pupillary response passes the biometric application threshold comprises determining that a difference of the pupil radius exceeds the biometric application threshold, wherein the biometric application threshold associates a difference of the pupil radius with an image quality metric.

In a 46th aspect, the method of any one of aspects 41-45, wherein the image quality metric comprises a measure relating to one or more of: eye blink, glare, defocus, resolution, occluded pixels, unoccluded pixels, noise, artifacts, or blur.

In a 47th aspect, the method of any one of aspects 41-46, wherein performing the biometric application comprises determining a cognitive load or determining an emotional response.

In a 48th aspect, the method of any one of aspects 41-47, wherein performing a biometric application comprises estimating an eye pose or generating an iris code.

In a 49th aspect, the method of any one of aspects 41-48, wherein adjusting the level of blue light is performed in a feedback loop until a target equilibrium state of the eye is reached.

In a 50th aspect, a hardware processor programmed to perform the method of any one of aspects 41-49.

In a 51st aspect, a wearable display system for performing biometric applications is disclosed. The wearable display system comprises: the hardware processor of aspect 50; and an image device configured to transmit eye images of a wearer of the wearable display system to the hardware processor.

In a 52nd aspect, the wearable display system of aspect 51, wherein the hardware processor is further programmed to perform the method of any one of aspects 41-49 to adjust the level of blue light exposed to an eye.

In a 53rd aspect, a head mounted display system comprising: a display; an image capture device configured to capture an image of an eye; and a hardware processor programmed to: adjust a level of blue light; and perform a biometric application.

In a 54th aspect, the head mounted display system of aspect 53, wherein to adjust the level of blue light comprises adjusting light in a wavelength range from 445 nm to 525 nm.

In a 55th aspect, the head mounted display system of aspect 53 or aspect 54, wherein to adjust the level of blue light, the hardware processor is programmed to: adjust pixels of the display to increase the blue values of pixels relative to the other color values.

In a 56th aspect, the head mounted display system of any one of aspects 53-55, wherein the display is configured to present a plurality of depth planes to the wearer.

In a 57th aspect, the head mounted display system of any one of aspects 53-56, wherein the display is configured to present a light field image to the wearer.

In a 58th aspect, the head mounted display system of any one of aspects 53-57, wherein the display comprises a plurality of stacked waveguides.

In a 59th aspect, the head mounted display system of any one of aspects 53-58, wherein to adjust the level of blue light, the hardware processor is programmed to: adjust an image injection device to increase levels of blue light injected into a corresponding stacked waveguide of the plurality of stacked waveguides.

In a 60th aspect, the head mounted display system of any one of aspects 53-59, wherein the hardware processor is programmed to: measure a pupillary response of an eye exposed to the adjusted level of blue light.

In a 61st aspect, the head mounted display system of any one of aspects 53-60, wherein the pupillary response comprises a maximum radius of a pupil, a minimum radius of a pupil, a rise time of a pupil response to the adjusted level of blue light, a decay time of a pupil response to the adjusted level of blue light, or a delay time to the adjusted level of blue light.

In a 62nd aspect, the head mounted display system of any one of aspects 53-61, wherein the pupillary response comprises a circumference of the pupil.

In a 63rd aspect, the head mounted display system of any one of aspects 53-62, wherein the pupillary response comprises a rise curve for the rise time of the pupil response to the adjusted level of blue light or a decay curve for the decay time of the pupil response to the adjusted level of blue light.

In a 64th aspect, the head mounted display system of any one of aspects 53-63, wherein the biometric application comprises one or more of: generating an iris code, determining a cognitive response, authorizing access to the head mounted display system, identifying a wearer of the head mounted display system, displaying information associated with an individual associated with the determined pupillary response, or determining a physiological state of the wearer of the head mounted display system.

In a 65th aspect, the head mounted display system of any one of aspects 53-64, wherein the hardware processor is programmed to: present, during a start-up for the head mounted display system, an image that changes in level of blue light during the start-up.

In a 66th aspect, the head mounted display system of aspect 65, wherein the hardware processor is programmed to measure a pupillary response during the start-up, and perform a biometric identification action.

In a 67th aspect, the head mounted display system of aspect 66, wherein the biometric identification action comprises an identification of the wearer of the display system, a determination that the wearer of the display system is a living individual, a determination that the wearer of the display system is authorized to use the display system, or a display of information that is associated with an individual having the measured pupillary response.

In a 68th aspect, a method for identifying a human individual is disclosed. The method comprises: under control of computing hardware: adjusting a level of blue light; receiving an eye image of an eye exposed to the adjusted level of blue light; detecting a change in a pupillary response by comparison of the received eye image to a reference image; determining that the pupillary response corresponds to a biometric characteristic of a human individual; and allowing access to a biometric application based on the pupillary response determination.

In a 69th aspect, the method of aspect 68 further comprising: measuring a pupillary response of the eye exposed to the adjusted level of blue light.

In a 70th aspect, the method of aspect 68 or aspect 69, wherein the measured pupillary response comprises a maximum radius of a pupil, a minimum radius of a pupil, a rise time for a pupillary response curve to the adjusted level of blue light, a decay time for the pupillary response curve to the adjusted level of blue light, or a delay time to the adjusted level of blue light.

In a 71st aspect, the method of any one of aspects 68-70, wherein the pupillary response curve comprises a rise curve for the rise time of the pupillary response to the adjusted level of blue light or a decay curve for the decay time of the pupillary response to the adjusted level of blue light.

In a 72nd aspect, the method of any one of aspects 68-71, wherein the biometric characteristic of the human individual corresponds to a characteristic of an individual in a biometric database.

In a 73rd aspect, the method of any one of aspects 68-72, wherein determining that the pupillary response corresponds to a biometric characteristic of a human individual comprises determining that the pupillary response corresponds to a living human individual.

In a 74th aspect, the method of any one of aspects 68-73, further comprising: determining whether the pupillary response corresponds to an unconscious human individual, a sleeping individual, a tired individual, an inebriated individual, an individual under the influence of reflex or cognitively impairing substances, or an individual experiencing a corresponding level of cognitive load.

In a 75th aspect, the method of any one of aspects 68-74, wherein the biometric database comprises a plurality of individual data records, each individual data record including at least one biometric characteristic associated with an individual.

In a 76th aspect, the method of any one of aspects 68-75, further comprising: forming an individual biometric model comprising at least one of the maximum radius of the pupil, the minimum radius of the pupil, the rise time for the pupillary response curve to the adjusted level of blue light, the decay time for the pupillary response curve to the adjusted level of blue light, or the delay time to the adjusted level of blue light.

In a 77th aspect, the method of any one of aspects 68-76, wherein adjusting the level of blue light exposed to the eye comprises increasing the level of blue light.

In a 78th aspect, the method of any one of aspects 68-77, wherein increasing the level of blue light corresponds to at least one of flashing blue light for a time period, pulsing blue light for a time period, increasing areas of a display to blue pixels, shifting displayed pixels of a display to increased blue values, or increasing an amount of blue pixels in a display.

In a 79th aspect, the method of any one of aspects 68-78, wherein detecting the change in the pupillary response of the adjustment eye image relative to the initial eye image comprises comparing an iris radius of the adjustment eye image to an iris radius of the initial eye image.

In a 80th aspect, the method of any one of aspects 68-79, wherein determining that the detected change in the pupillary response passes the biometric application threshold comprises determined that a difference of the iris radius exceeds the biometric application threshold, wherein the biometric application threshold associates a difference of the iris radius with the image quality metric.

In a 81st aspect, the method of any one of aspects 68-80, wherein the image quality metric comprises a measure relating to one or more of: eye blink, glare, defocus, resolution, occluded pixels, unoccluded pixels, noise, artifacts, or blur.

In a 82nd aspect, the method of any one of aspects 68-81, wherein allowed biometric application comprises determining a cognitive load or determining an emotional response.

In a 83rd aspect, the method of any one of aspect 68-82, wherein the allowed biometric application comprises estimating an eye pose or generating an iris code.

In a 84th aspect, the method of any one of aspect 68-83, wherein the method is performed by an iris identification system.

In a 85th aspect, a hardware processor programmed to perform the method of any one of aspects 68-84.

In a 86th aspect, a wearable display system for performing biometric applications, the wearable display system comprising: the hardware processor of aspect 85; and an image device configured to transmit eye images of a wearer of the wearable display system to the hardware processor.

In a 87th aspect, the wearable display system of aspect 86, wherein the hardware processor is further programmed to perform the method of any one of aspects 68-83 to adjust the level of blue light exposed to an eye.

In a 88th aspect, a head mounted display system comprising: a display; an image capture device configured to capture an image of an eye; and a hardware processor programmed to: adjust a level of blue light; and perform a biometric application.

In a 89th aspect, the head mounted display system of aspect 88, wherein to adjust the level of blue light, the hardware processor is programmed to: adjust light in a wavelength range from 445 nm to 525 nm.

In a 90th aspect, the head mounted display system of aspect 88 or aspect 89, wherein to adjust the level of blue light, the hardware processor is programmed to: adjust pixels of the display to increase the blue values of pixels.

In a 91st aspect, the head mounted display system of any one of aspects 88-90, wherein the display is configured to present a plurality of depth planes to the wearer.

In a 92nd aspect, the head mounted display system of any one of aspects 88-91, wherein the display is configured to present a light field image to the wearer.

In a 93rd aspect, the head mounted display system of any one of aspects 88-92, wherein the display comprises a plurality of stacked waveguides.

In a 94th aspect, the head mounted display system of any one of aspects 88-93, wherein to adjust the level of blue light, the hardware processor is programmed to: adjust an image injection device to increase levels of blue light injected into a corresponding stacked waveguide of the plurality of stacked waveguides.

In a 95th aspect, the head mounted display system of any one of aspects 88-94, wherein the hardware processor is further programmed to: obtain eye images under normal light conditions; and obtain eye images under the adjusted level of blue light.

In a 96th aspect, the head mounted display system of any one of aspects 88-95, wherein the hardware processor is further programmed to: form an individual biometric model comprising at least one of a first rise time for a pupillary response curve to an increased level of normal light conditions, a first decay time for the pupillary response curve to a decreased level of normal light conditions, a first delay time to the increased level of normal light conditions, a first rise curve for the first rise time, a first decay curve for the first decay time, a second rise time for a pupillary response curve to the adjusted level of blue light, a second decay time for the pupillary response curve to the adjusted level of blue light, a second delay time to the adjusted level of blue light, a second rise curve portion of the pupillary response curve to the adjusted level of blue light, or a second decay curve portion of the pupillary response curve to the adjusted level of blue light.

In a 97th aspect, the head mounted display system of any one of aspects 88-96, wherein the hardware processor is programmed to: obtain eye images for an individual utilizing the head mounted display system while experiencing a cognitive load.

In a 98th aspect, the head mounted display system of aspect 97, wherein the hardware processor is programmed to: detect changes in the pupillary response for the individual utilizing the head mounted display while experiencing the cognitive load.

In a 99th aspect, the head mounted display system of any one of aspects 97-98, wherein the hardware processor is programmed to: correlate the detected change in the pupillary response to a cognitive load score.

In a 100th aspect, the head mounted display system of 99, wherein the detected change in the pupillary response corresponds to an increased pupil radius relative to a pupil radius under normal lighting conditions.

In a 101st aspect, the head mounted display system of any one of aspects 97-100, wherein the hardware processor is programmed to: determine a current pupillary response of the individual utilizing the head mounted display system; correlate the current pupillary response with an individual biometric model to generate a cognitive load pupillary response, wherein the individual biometric model includes a pupillary response under normal cognitive load; determine a level of cognitive load based on the cognitive load pupillary response.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A head mounted display system configured to project variable levels of blue light to an eye of a user, the display system comprising:
    a frame configured to be wearable on the head of the user;
    a display configured to project at least blue light into the eye of the user and to modify an intensity of the blue light relative to an intensity of non-blue light;
    a camera configured to capture a first image of the eye while the display projects light at a first ratio of intensity of blue light to non-blue light into the eye and configured to capture a second image of the eye while the display projects a second ratio of intensity of blue light to non-blue light different from the first ratio into the eye; and
    a hardware processor programmed to:
        analyze the images from the camera to determine a change in a pupil parameter between the second image and the first image passes a biometric application threshold;
        based at least in part on the determined change, instruct the display to modify a ratio of the intensity of blue light to non-blue light and instruct the camera to capture a third image of the eye;
        determine that a change in the pupil parameter between the third image and the first image or the second image matches a biometric characteristic of a human individual; and
        based on the determination that a change in the pupil parameter between the third image and the first image or the second image matches a biometric characteristic of a human individual, determine an identity of the human individual.

2. The head mounted display system of claim 1, wherein the display comprises a scanning fiber projector.

3. The head mounted display system of claim 1, wherein the hardware processor is programmed to restrict access to a system application if the identity of the individual does not match an identity of an individual authorized to use the system application.

4. The head mounted display system of claim 3, wherein the system application comprises displaying images as if at a plurality of depths.

5. The head mounted display system of claim 1, wherein the display is configured to modify the intensity of light in a wavelength range of between 445 nm and 525 nm.

6. The head mounted display system of claim 1, wherein the display is configured to increase the second ratio of intensity of blue light to non-blue light by flashing blue light for longer than 10 ms.

7. The head mounted display system of claim 1, wherein the display is configured to project light at two or more colors.

8. The head mounted display system of claim 1, wherein the display is configured to display content as if at a plurality of depths from a user.

9. The head mounted display system of claim 1, wherein the display comprises a plurality of stacked waveguides.

10. The head mounted display system of claim 9, wherein to instruct the display to modify the intensity of blue light relative to non-blue light, the hardware processor is programmed to instruct an image injection device to increase a proportion of blue light injected into a corresponding stacked waveguide of the plurality of stacked waveguides.

11. The head mounted display system of claim 1, wherein the hardware processor is further configured to form an individual biometric model comprising at least one of a first rise time of a pupillary response to the first ratio of intensity of blue light to intensity of non-blue light, a first decay time of the pupillary response to the first ratio of intensity of blue light to intensity of non-blue light, a first delay time of the pupillary response to the first ratio of intensity of blue light to intensity of non-blue light, a first rise curve of the pupillary response to the first ratio of intensity of blue light to intensity of non-blue light, a first decay curve of the pupillary response to the first ratio of intensity of blue light to intensity of non-blue light, a second rise time of a pupillary response to the second ratio of intensity of blue light to intensity of non-blue light, a second decay time of the pupillary response to the second ratio of intensity of blue light to intensity of non-blue light, a second delay time of the pupillary response to the second ratio of intensity of blue light to intensity of non-blue light, a second rise curve of the pupillary response to the second ratio of intensity of blue light to intensity of non-blue light, or a second decay curve of the pupillary response to the second ratio of intensity of blue light to intensity of non-blue light.

12. The head mounted display system of claim 1, wherein the hardware processor is programmed to calculate a cognitive load score based on a change in the pupil parameter.

13. The head mounted display system of 1, wherein a change in the pupil parameter comprises an increased pupil radius.

14. The head mounted display system of claim 1, wherein the hardware processor is programmed to:
determine a current change in the pupil parameter of an individual wearing the head mounted display system;
correlate the current change in the pupil parameter with a modelled change in the pupil parameter of an individual biometric model to generate a cognitive load pupillary response, wherein the modelled change comprises a change in a pupil parameter under a normal cognitive load; and
determine a level of cognitive load based on the cognitive load pupillary response.

15. A method for identifying a human individual using a wearable display system comprising a camera coupled to computing hardware, the wearable display system comprising a stack of waveguides configured to direct light into the eye, the method comprising:
directing reference light comprising a first ratio of an intensity of blue light to an intensity of non-blue light into the eye;
using the camera, capturing a first image of the eye while reference light is directed into the eye;
directing modified light comprising a second ratio of an intensity of blue light to an intensity of non-blue light different from the first ratio into the eye;
using the camera, capturing a second image of the eye while modified light is directed into the eye;
detecting a change in a pupil parameter of the eye between the first image and the second image;
determining that the detected change in the pupil parameter passes a biometric application threshold;
based at least in part on the determination, modifying a ratio of the intensity of blue light to non-blue light;
using the camera, capturing a third image of the eye;
determining that a change in the pupil parameter between the third image and the first image or the second image matches a biometric characteristic of a human individual; and
based on the determination that a change in the pupil parameter between the third image and the first image or the second image matches a biometric characteristic of a human individual, identifying the human individual.

16. The method of claim 15 further comprising allowing access to a system application based on the change in the pupil parameter between the third image and the first image or the second image.

17. The method of claim 16, wherein allowing access to a system application based on the change in the pupil parameter between the third image and the first image or the second image comprises at least one of determining a cognitive load, estimating an eye pose, generating an iris code, or determining an emotional response.

18. The method of claim 15, wherein the pupil parameter comprises at least one of a maximum radius of the pupil, a minimum radius of the pupil, a rise time of a pupillary response to the second ratio of intensity of blue light to intensity of non-blue light, a decay time of a pupillary response to the second ratio of intensity of blue light to intensity of non-blue light, or a delay time of a pupillary response to the second ratio of intensity of blue light to intensity of non-blue light.

19. The method of claim 15, further comprising determining that the change in the pupil parameter between the third image and the first image or the second image matches a change in pupil parameter of at least one of an unconscious human individual, a sleeping individual, a tired individual, an inebriated individual, or an individual under the influence of cognition-impairing substances.

20. The method of claim 15, further comprising determining that an image quality metric measured from the second image exceeds an image quality threshold, the image quality metric comprising a distance between a part of the eye and an eyelid.

* * * * *